United States Patent
Aizawa et al.

(10) Patent No.: US 8,493,597 B2
(45) Date of Patent: Jul. 23, 2013

(54) IMAGE PROCESSING APPARATUS WITH A CHANGE PROCESSING SECTION AND A CHANGE REQUESTING SECTION FOR PROCESSING INSTRUCTIONS OF CHANGE

(75) Inventors: Hiroaki Aizawa, Hachioji (JP); Yasuaki Sugimoto, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 524 days.

(21) Appl. No.: 12/788,642

(22) Filed: May 27, 2010

(65) Prior Publication Data

US 2010/0309513 A1  Dec. 9, 2010

(30) Foreign Application Priority Data

Jun. 5, 2009  (JP) ................. 2009-136704

(51) Int. Cl.
  *G06F 3/12* (2006.01)
  *G06F 15/00* (2006.01)
  *G06K 1/00* (2006.01)
(52) U.S. Cl.
  USPC .......................................... 358/1.15; 358/1.9
(58) Field of Classification Search
  None
  See application file for complete search history.

(56) References Cited

U.S. PATENT DOCUMENTS

| | | | |
|---|---|---|---|
| 6,549,301 B1 | 4/2003 | Yasukawa | |
| 2002/0051205 A1* | 5/2002 | Teranishi et al. | 358/1.18 |
| 2002/0060805 A1* | 5/2002 | Tomita | 358/1.15 |
| 2002/0078275 A1* | 6/2002 | Yamaguchi | 710/72 |
| 2003/0086117 A1* | 5/2003 | Lester et al. | 358/1.15 |
| 2003/0137696 A1* | 7/2003 | Wardell et al. | 358/1.18 |
| 2003/0174345 A1* | 9/2003 | Kato et al. | 358/1.2 |
| 2004/0036908 A1* | 2/2004 | Yagita et al. | 358/1.15 |
| 2005/0206950 A1* | 9/2005 | Ushiro et al. | 358/1.15 |
| 2006/0114499 A1* | 6/2006 | Sumita et al. | 358/1.15 |
| 2007/0201091 A1* | 8/2007 | Tanaka | 358/1.16 |
| 2009/0046316 A1* | 2/2009 | Morohashi et al. | 358/1.15 |
| 2009/0109481 A1* | 4/2009 | Ozaki | 358/1.15 |

FOREIGN PATENT DOCUMENTS

| | | |
|---|---|---|
| EP | 1544722 A2 | 6/2005 |
| JP | 07-334318 | 12/1995 |
| JP | 2002-029119 | 1/2002 |
| JP | 2003-300367 | 10/2003 |

(Continued)

OTHER PUBLICATIONS

Office Action (Notice of Reasons for Refusal) dated Jun. 29, 2011, issued in the corresponding Japanese Patent Application No. 2009-136704, and an English Translation thereof.

(Continued)

*Primary Examiner* — Ming Hon
(74) *Attorney, Agent, or Firm* — Buchanan Ingersoll & Rooney PC

(57) ABSTRACT

An image processing apparatus (MFP) stores a print job received from a terminal apparatus even after printing (S201 to S203), setting change operations received from the operation section of the image processing apparatus for the stored print job (S204). Whether the image processing apparatus carries out the processing of updating the data of the print job corresponding to those setting changes in that image processing apparatus itself or makes the printer driver in the terminal apparatus carry it out is judged based on the contents of the setting changes and the processing capacity of the image processing apparatus (S205, S206), and the execution is done in one of them.

21 Claims, 41 Drawing Sheets

FOREIGN PATENT DOCUMENTS

| | | |
|---|---|---|
| JP | 2005-267310 | 9/2005 |
| JP | 2007-257627 | 10/2007 |
| JP | 2007-304881 A | 11/2007 |

OTHER PUBLICATIONS

Office Action (Notice of Reasons for Refusal) dated Feb. 1, 2011, issued in the corresponding Japanese Patent Application No. 2009-136704, and an English Translation thereof.

European Search Report issued in corresponding EP application No. 10164042.3, dated Dec. 13, 2012.

Office Action issued in corresponding Chinese Patent Application No. 201010197101.4, mailed May 9, 2012, and English translation thereof.

* cited by examiner

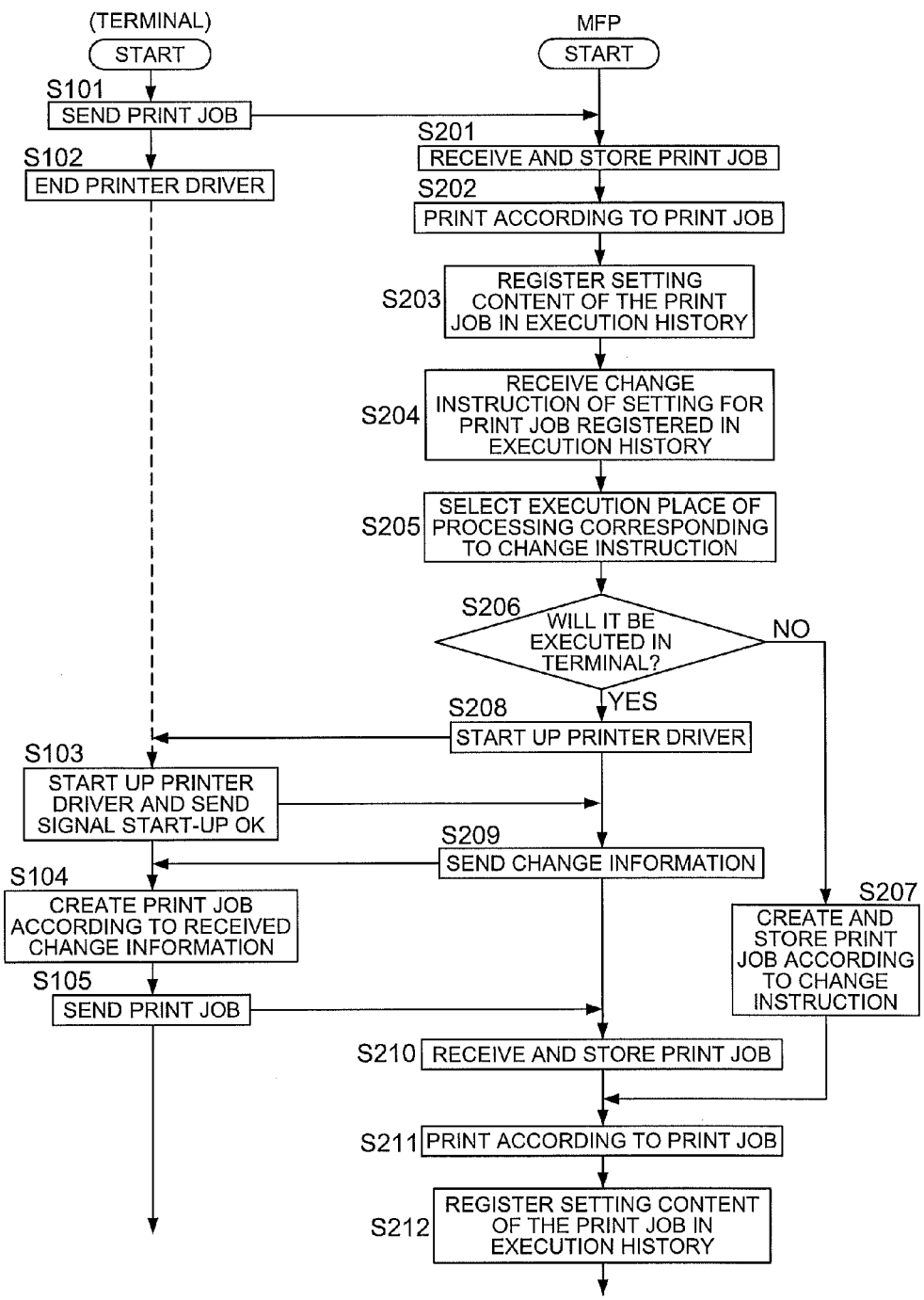

FIG. 5

HISTORY TABLE OF EXECUTED JOB AND SET JOB FOR MR. "A" — 60

| No. | SOURCE OF SETTING | SETTING CONTENT | | | | | | | | | |
|---|---|---|---|---|---|---|---|---|---|---|---|
| 1 | TERMINAL 1 10.12.P40:37 | [ORIGINAL DOCUMENT SIZE] A3 SEF | 2 IN 1 | COLOR | [FILE FORMAT] PDF | [READING SIZE] A3 SEF | | | | | |
| 2 | MFP | [FILE TRANSMISSION] E-MAIL | | | | | [DESTINATION] B**** | | | | |
| 3 | MFP | [FILE TRANSMISSION] SMB | | | [FILE FORMAT] PDF | | | [GROUP NAME] TOKYO | [USER] SEIGYO 11 | [PASSWORD] ****** | [BROADCAST SETTING] |
| 4 | TERMINAL 2 10.12.P40:29 | [ORIGINAL DOCUMENT SIZE] B4 SEF | | | | | NUMBERING | | STAPLING | | |
| 5 | MFP | [FILE TRANSMISSION] E-MAIL | | | [FILE FORMAT] PDF | | [DESTINATION] A**** | BINDING MARGIN | | DOUBLE-SIDED | [READING SIZE] A3 SEF |
| 6 | TERMINAL 2 10.12.P40:29 | [ORIGINAL DOCUMENT SIZE] B4 LEF | | MONOCHROME | | | | | | | |

| PROCESSING PLACE | TERMINAL | MFP |
|---|---|---|
| CHANGE ELEMENT | SCALING<br>16 IN 1<br>8 IN 1<br>4 IN 1<br>2 IN 1<br>PRINT ORIENTATION<br>MONOCHROME/COLOR<br>WATERMARK<br>NUMBERING<br>PAGE UNIT SETTING<br>FRONT/REAR COVER SHEET<br>CHAPTERING | STAPLING<br>FOLDING<br>PUNCHING<br>SORTING<br>SORT/GROUP<br>SHEET FEED TRAY<br>SHEET EJECTION TRAY<br>PRINT COPY NUMBER<br>DOUBLE-SIDED/SINGLE-SIDED |

FIG. 9

HISTORY TABLE OF EXECUTED JOB AND SET JOB FOR MR. "A" — 60B

| No. | SOURCE OF SETTING | SETTING CONTENT | | | | | | | |
|---|---|---|---|---|---|---|---|---|---|
| 1 | TERMINAL 1 10.12.P40:37 | [ORIGINAL DOCUMENT SIZE] A3 SEF | COLOR | DOUBLE-SIDED | | | | | |
| 2 | MFP | [FILE TRANSMISSION] E-MAIL | [FILE FORMAT] PDF | [DOUBLE-SIDED] | [READING SIZE] A3 SEF | | | | |
| 3 | MFP | [FILE TRANSMISSION] SMB | [DESTINATION] B**** | NUMBERING | [GROUP NAME] TOKYO | [USER] SEIGYO 11 | [PASSWORD] ******* | BROADCAST SETTING  | |
| 4 | TERMINAL 2 10.12.P40:29 | [ORIGINAL DOCUMENT SIZE] B4 SEF | | | BINDING MARGIN | STAPLING | | | |
| 5 | MFP | [FILE TRANSMISSION] E-MAIL | [DESTINATION] A**** | | [FILE FORMAT] PDF | DOUBLE-SIDED | [READING SIZE] A3 SEF | | |
| 6 | TERMINAL 2 10.12.P40:29 | [ORIGINAL DOCUMENT SIZE] B4 LEF | MONOCHROME | | | | | | |

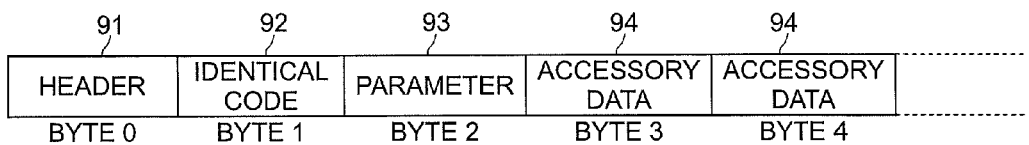

FIG. 10b

| BYTE | DATA | COMMENT |
|---|---|---|
| BYTE 0 | HEADER | ATTRIBUTE INFORMATION OF PACKET<br>CODE IDENTIFYING FOLLOWING THREE SIGNALS<br><br>P1: COMMAND SIGNAL<br>P2: ACK SIGNAL<br>P3: RESULT SIGNAL |
| BYTE 1 | IDENTICAL CODE | ID CODE DESIGNATED FOR EACH ATTRIBUTE (OPERATION CODE)<br><br>CODE IDENTIFYING PLURAL TYPES OF COMMAND SIGNALS (SIMILAR TO ACK SIGNAL AND RESULT SIGNAL) |
| BYTE 2 | PARAMETER | PARAMETER AREA<br>COMMUNICATION RESULT CONTENT ON RESULT SIGNAL<br><DETAIL><br>• [SUCCESS]//COMMAND NORMAL END<br>• [ERROR 1]//COMMAND ABNORMAL END<br>• [ERROR 2]//SEQUENCE ERROR<br>• [ERROR 3]//TIME-OUT ERROR |
| BYTE 3- | ACCESSORY DATA | ADDED UNIVERSAL DATA<br>THE FOLLOWING DATA ARE SET IN EXAMPLES.<br>[PRINT JOB] DATA |

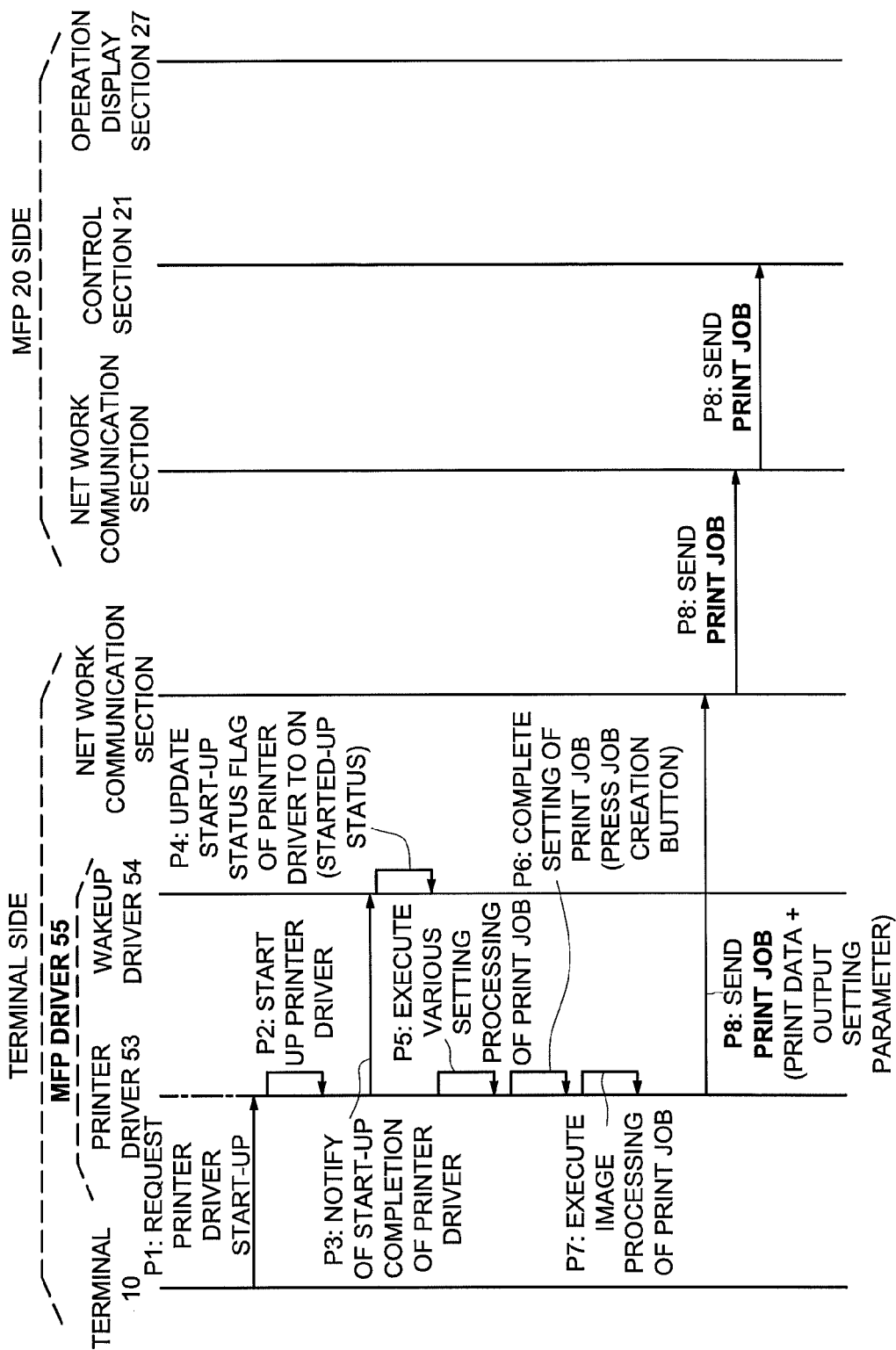

FIG. 33

CONTROL TABLE A 70A

| PROCESSING PLACE | TERMINAL | MFP | |
|---|---|---|---|
| CHANGE ELEMENT | | STAPLING<br>FOLDING<br>PUNCHING<br>SORTING<br>SORT/GROUP<br>SHEET FEED TRAY<br>SHEET EJECTION TRAY<br>PRINT COPY NUMBER<br>DOUBLE-SIDED/SINGLE-SIDED | 8 IN 1<br>4 IN 1<br>2 IN 1<br>WATERMARK<br>NUMBERING<br>FRONT/REAR COVER SHEET<br>SCALING<br>16 IN 1<br>PRINT ORIENTATION<br>MONOCHROME/COLOR<br>PAGE UNIT SETTING<br>CHAPTERING |

CONTROL TABLE B

| PROCESSING PLACE | TERMINAL | MFP |
|---|---|---|
| CHANGE ELEMENT | SCALING<br>16 IN 1<br>8 IN 1<br>PRINT ORIENTATION<br>MONOCHROME/COLOR<br>WATERMARK<br>NUMBERING<br>PAGE UNIT SETTING<br>CHAPTERING | STAPLING<br>FOLDING<br>PUNCHING<br>SORTING<br>SORT/GROUP<br>SHEET FEED TRAY<br>SHEET EJECTION TRAY<br>PRINT COPY NUMBER<br>DOUBLE-SIDED/SINGLE-SIDED<br>4 IN 1<br>2 IN 1<br>FRONT/REAR COVER SHEET |

70B

CONTROL TABLE C

| PROCESSING PLACE | TERMINAL | MFP |
|---|---|---|
| CHANGE ELEMENT | SCALING<br>16 IN 1<br>8 IN 1<br>4 IN 1<br>2 IN 1<br>PRINT ORIENTATION<br>MONOCHROME/COLOR<br>WATERMARK<br>NUMBERING<br>PAGE UNIT SETTING<br>FRONT/REAR COVER SHEET<br>CHAPTERING | STAPLING<br>FOLDING<br>PUNCHING<br>SORTING<br>SORT/GROUP<br>SHEET FEED TRAY<br>SHEET EJECTION TRAY<br>PRINT COPY NUMBER<br>DOUBLE-SIDED/SINGLE-SIDED |

CONTROL TABLE D

| PROCESSING PLACE | TERMINAL | MFP |
|---|---|---|
| CHANGE ELEMENT | SCALING<br>16 IN 1<br>8 IN 1<br>4 IN 1<br>2 IN 1<br>PRINT ORIENTATION<br>MONOCHROME/COLOR<br>WATERMARK<br>NUMBERING<br>PAGE UNIT SETTING<br>FRONT/REAR COVER SHEET<br>CHAPTERING<br>SORT/GROUP<br>DOUBLE-SIDED/SINGLE-SIDED | STAPLING<br>FOLDING<br>PUNCHING<br>SORTING<br>SHEET FEED TRAY<br>SHEET EJECTION TRAY<br>PRINT COPY NUMBER |

~70D

CONTROL TABLE E

| PROCESSING PLACE | TERMINAL | MFP |
|---|---|---|
| CHANGE ELEMENT | SCALING     STAPLING<br>16 IN 1     FOLDING<br>8 IN 1     PUNCHING<br>4 IN 1     SORTING<br>2 IN 1     SORT/GROUP<br>PRINT ORIENTATION     DOUBLE-SIDED/SINGLE-SIDED<br>MONOCHROME/COLOR     SHEET FEED TRAY<br>WATERMARK     SHEET EJECTION TRAY<br>NUMBERING     PRINT COPY NUMBER<br>PAGE UNIT SETTING<br>FRONT/REAR COVER SHEET<br>CHAPTERING | |

~70E

FIG. 35a
CPU

| SPECIFICATION | COEFFICIENT |
|---|---|
| 2.5 GHz | 1.0 |
| 2.0 GHz | 0.8 |
| 1.5 GHz | 0.6 |
| 1.0 GHz | 0.4 |
| 0.5 GHz | 0.2 |

FIG. 35b
MEMORY

| SPECIFICATION | COEFFICIENT |
|---|---|
| 4.0 GB | 1.0 |
| 2.0 GB | 0.8 |
| 1.0 GB | 0.6 |
| 512 MB | 0.4 |
| 256 MB | 0.2 |

FIG. 35c
α: CPU COEFFICIENT x MEMORY COEFFICIENT

| α | RANK |
|---|---|
| $1.0 \leq \alpha \leq 0.8$ | A |
| $0.8 < \alpha \leq 0.6$ | B |
| $0.6 < \alpha \leq 0.4$ | C |
| $0.4 < \alpha \leq 0.2$ | D |
| $0.2 < \alpha \leq 0$ | E |

FIG. 35d

| MEMORY[B] \ CPU [GHz] | 2.5 | 2.0 | 1.5 | 1.0 | 0.5 |
|---|---|---|---|---|---|
| 4.0 G | A | A | B | C | D |
| 2.0 G | A | B | C | D | E |
| 1.0 G | B | C | D | D | E |
| 512 M | C | D | D | D | E |
| 256 M | D | E | E | E | E |

EXAMPLE) CPU: 2.0 GHz, MEMORY: 2.0GB

FIG. 36a
CPU

| USAGE RATE | COEFFICIENT |
|---|---|
| 0% | 1.0 |
| 25% | 0.8 |
| 50% | 0.5 |
| 75% | 0.3 |
| 100% | 0 |

FIG. 36b
MEMORY

| USAGE RATE | COEFFICIENT |
|---|---|
| 0% | 1.0 |
| 25% | 0.8 |
| 50% | 0.5 |
| 75% | 0.3 |
| 100% | 0 |

FIG. 36c
α: CPU COEFFICIENT × MEMORY COEFFICIENT

| α | RANK |
|---|---|
| $1.0 \leq \alpha \leq 0.8$ | A |
| $0.8 < \alpha \leq 0.5$ | B |
| $0.5 < \alpha \leq 0.3$ | C |
| $0.3 < \alpha \leq 0.1$ | D |
| $0.1 < \alpha \leq 0$ | E |

FIG. 36d

CPU USAGE RATE [%]

| MEMORY USAGE RATE[%] | 0 | 25 | 50 | 75 | 100 |
|---|---|---|---|---|---|
| 0 | A | A | B | C | E |
| 25 | A | B | C | D | E |
| 50 | B | C | C | D | E |
| 75 | C | C | D | D | E |
| 100 | E | E | E | E | E |

FIG. 37

CONTROL TABLE A

| PROCESSING PLACE | TERMINAL | MFP | |
|---|---|---|---|
| CHANGE ELEMENT | | STAPLING<br>FOLDING<br>PUNCHING<br>SORTING<br>SORT/GROUP<br>SHEET FEED TRAY<br>SHEET EJECTION TRAY<br>PRINT COPY NUMBER<br>DOUBLE-SIDED/SINGLE-SIDED<br>4 IN 1<br>2 IN 1<br>FRONT/REAR COVER SHEET | SCALING<br>16 IN 1<br>8 IN 1<br>PRINT ORIENTATION<br>MONOCHROME/COLOR<br>WATERMARK<br>NUMBERING<br>PAGE UNIT SETTING<br>CHAPTERING |

72A

CONTROL TABLE B

| PROCESSING PLACE | TERMINAL | MFP |
|---|---|---|
| CHANGE ELEMENT | SCALING<br>16 IN 1<br>8 IN 1<br>4 IN 1<br>2 IN 1<br>PRINT ORIENTATION<br>MONOCHROME/COLOR<br>WATERMARK<br>NUMBERING<br>PAGE UNIT SETTING<br>FRONT/REAR COVER SHEET<br>CHAPTERING | STAPLING<br>FOLDING<br>PUNCHING<br>SORTING<br>SORT/GROUP<br>SHEET FEED TRAY<br>SHEET EJECTION TRAY<br>PRINT COPY NUMBER<br>DOUBLE-SIDED/SINGLE-SIDED |

72B

CONTROL TABLE C

| PROCESSING PLACE | TERMINAL | MFP |
|---|---|---|
| CHANGE ELEMENT | SCALING<br>16 IN 1<br>8 IN 1<br>4 IN 1<br>2 IN 1<br>PRINT ORIENTATION<br>MONOCHROME/COLOR<br>WATERMARK<br>NUMBERING<br>PAGE UNIT SETTING<br>FRONT/REAR COVER SHEET<br>CHAPTERING<br>SORT/GROUP<br>DOUBLE-SIDED/SINGLE-SIDED | STAPLING<br>FOLDING<br>PUNCHING<br>SORTING<br>SHEET FEED TRAY<br>SHEET EJECTION TRAY<br>PRINT COPY NUMBER |

CONTROL TABLE D 72D

| PROCESSING PLACE | TERMINAL | | MFP |
|---|---|---|---|
| CHANGE ELEMENT | SCALING<br>16 IN 1<br>8 IN 1<br>4 IN 1<br>2 IN 1<br>PRINT ORIENTATION<br>MONOCHROME/COLOR<br>WATERMARK<br>NUMBERING<br>PAGE UNIT SETTING<br>FRONT/REAR COVER SHEET<br>CHAPTERING | STAPLING<br>FOLDING<br>PUNCHING<br>SORTING<br>SORT/GROUP<br>DOUBLE-SIDED/SINGLE-SIDED | SHEET FEED TRAY<br>SHEET EJECTION TRAY<br>PRINT COPY NUMBER |

CONTROL TABLE E

| PROCESSING PLACE | TERMINAL | | MFP |
|---|---|---|---|
| CHANGE ELEMENT | SCALING<br>16 IN 1<br>8 IN 1<br>4 IN 1<br>2 IN 1<br>PRINT ORIENTATION<br>MONOCHROME/COLOR<br>WATERMARK<br>NUMBERING<br>PAGE UNIT SETTING<br>FRONT/REAR COVER SHEET<br>CHAPTERING | STAPLING<br>FOLDING<br>PUNCHING<br>SORTING<br>SORT/GROUP<br>DOUBLE-SIDED/SINGLE-SIDED<br>SHEET FEED TRAY<br>SHEET EJECTION TRAY<br>PRINT COPY NUMBER | |

72E

IMAGE PROCESSING APPARATUS WITH A CHANGE PROCESSING SECTION AND A CHANGE REQUESTING SECTION FOR PROCESSING INSTRUCTIONS OF CHANGE

This application is based on Japanese Patent Application No. 2009-136704 filed on Jun. 5, 2009 with Japanese Patent Office, the entire content of which is hereby incorporated by reference.

BACKGROUND OF THE INVENTION

The present invention relates to image processing apparatuses that store print jobs received from terminal apparatuses even after printing, and accept operations of changing the contents of settings for those stored print jobs.

In the process of producing printed matter, a print job is created in a terminal apparatus such as a PC (personal computer), and is transmitted to a printing apparatus where it is made to be printed, and then the printed matter that is outputted is verified by visual inspection by an operator. Depending on the result of such verification any necessary corrections are made and the printed matter is printed again, or when the result of verification indicates that the printed matter is normal, the process can be transferred to large volume printing. At this time, in a system configuration in which the operator carries out the work by traveling between the terminal apparatus and the printing apparatus, the work efficiency is not high in an installation environment in which the terminal apparatus and the printing apparatus are placed distant from each other.

In view of this, there exists a printing apparatus in which a print job received from a terminal apparatus is stored in the printing apparatus even after the printing is completed, and change instructions related to the output settings such as punching or stapling are received by the operation section of the printing apparatus, and then changes according to those change instructions are made in that apparatus itself for the stored print jobs.

Further, a printer system has been proposed (see, for example, Unexamined Japanese Patent Application Publication No. 2007-304881), in which, when a remote desktop connection request is made from the printing apparatus to the terminal apparatus, the display data of an operation screen by a graphic user interface is transmitted from the terminal apparatus to the printing apparatus, and remote operation of the terminal apparatus can be carried out from the printing apparatus through that operation screen. In this printer system, by remote operation from the printing apparatus, it is possible to start the printer driver of the terminal apparatus, to carry out setting of the printing conditions again, and to instruct the printing.

In a system in which the items that can be changed in the printing apparatus are limited to those related to the output settings such as punching or stapling, for example, when changing the settings related to the image enlargement or reduction function, or the N in 1 function by which images of a plurality of pages (N pages) are reduced and fitted in one page, it is necessary to return to the terminal apparatus and carry out the work.

On the other hand, in a method of carrying out the remote desktop connection such as in Unexamined Japanese Patent Application Publication No. 2007-304881, although there is no limitation on the items that can be changed, a more than necessary load is placed on the communication lines, since a print job is always created by the printer driver and is transmitted to the printing apparatus when changing any item. For example, even when making changes only regarding stapling, the entire print job including the image data is transmitted from the terminal apparatus to the printing apparatus, and the communication load increases.

The present invention was made for solving the above problem, and an object of the present invention is to provide an image processing apparatus in which, for a print job received from a terminal apparatus, a variety of setting changes can be carried out without increasing the communication load between it and the terminal apparatus by more than that necessary, and also without the operator having to return to the terminal apparatus.

SUMMARY

To achieve at least one of the abovementioned objects, an image processing apparatus reflecting one aspect of the present invention comprises as follows as the preferred embodiment [1].

[1] An image processing apparatus having:
a receiving section which receives a print job created by a printer driver;
a storage section which stores the print job received by the receiving section;
a printer section which carries out printing related to the print job received by the receiving section;
a change receiving section which receives an instruction of change in a content of setting of the print job stored in the storage section;
a change processing section which creates a print job by changing the content of setting of the print job stored in the storage section based on the instruction of change received by the change receiving section;
a change requesting section which informs the printer driver about content of the instruction of change received by the change receiving section, and allows the printer driver to create a print job by changing the content of setting of the print job based on the instruction of change; and
a control section which selects whether to allow the change processing section or the change requesting section to handle the instruction of change received by the change receiving section, and allows a selected section to handle the instruction of change.

BRIEF DESCRIPTION OF THE DRAWINGS

FIG. 4 is a flow chart showing the operations when the image processing apparatus receives the operations of setting changes made by the user through the operation display section for a print job that has been received from a terminal apparatus and has been stored.

FIG. 5 is a front view diagram showing an example of the execution history screen.

FIG. 7 is an explanatory diagram showing a control table of change elements.

FIG. 9 is a front view diagram showing an example of an execution history screen after changing the settings and executing the print job.

FIGS. 10a and 10b are explanatory diagrams showing the data structure for the command signal, and others, used in the communication between the terminal apparatus and the image processing apparatus.

FIG. 11 is an explanatory diagram showing the operation sequence (the operation sequence 1) from initially transmitting a print job from a terminal apparatus to the image processing apparatus until printing.

FIG. 33 is an explanatory diagram showing the control tables of different ranks based on the processing capacity specifications.

FIG. 34 is an explanatory diagram showing the control tables subsequent to FIG. 33.

FIGS. 35a to 35d are explanatory diagrams showing the CPU coefficient, memory coefficient and others, based on the specifications.

FIGS. 36a to 36d are explanatory diagrams showing the CPU coefficient, memory coefficient and others, based on the usage rate.

FIG. 37 is an explanatory diagram showing the control tables of different ranks based on the usage rate.

FIG. 38 is an explanatory diagram showing the control tables subsequent to FIG. 37.

DETAILED DESCRIPTION OF THE PREFERRED EMBODIMENT

Figure 1:
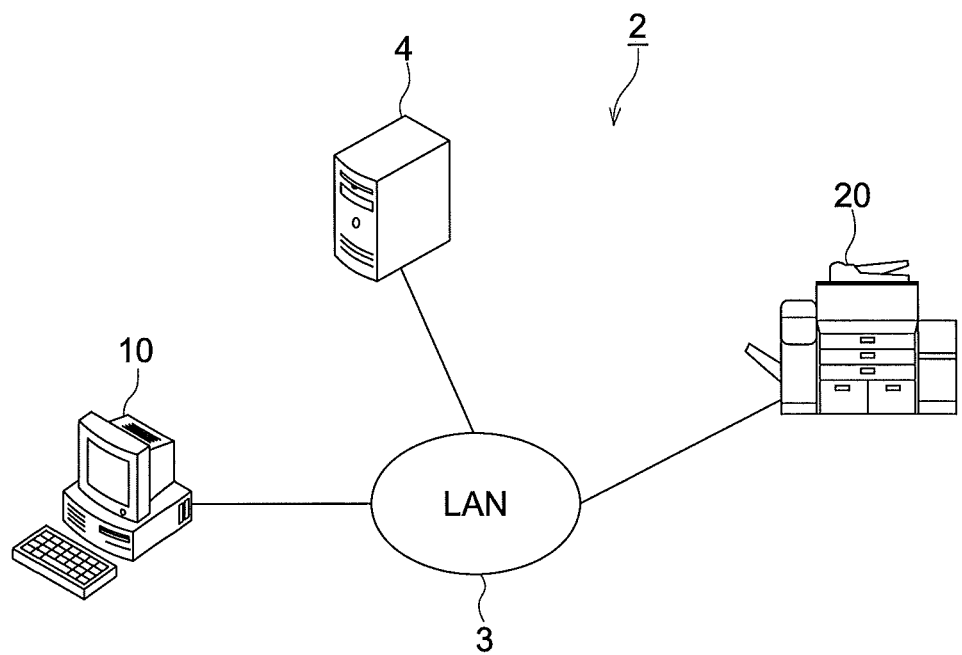
FIG. 1 is an explanatory diagram showing a configuration example of a printing system that includes an image processing apparatus according to a preferred embodiment of the present invention.

In a preferred embodiment of the present invention [1], the image processing apparatus stores a print job that has been received from a terminal apparatus even after printing. Next, when an instruction for changing the setting contents is received from the operation section of that image processing apparatus for that print job, a selection is made as to whether to carry out the processing of changing the data of the print job corresponding to that change instruction in the apparatus itself (the change processing section) or to make the printer driver of the terminal apparatus carry out the processing, and the processing is performed by the selected one. Because of this, the processing of changing the data of the print job, for example, can be made to be executed at the appropriate location according to various factors such as the contents of the setting changes and the processing capacity of the apparatus.

Other preferred embodiments of the present invention are described below.

[2] The image processing apparatus of Item [1] with the feature that the control section carries out the selection based on the content of the instruction of change.

In the above preferred embodiment of the present invention, the location of executing the processing of changing the data of a print job is selected according to the contents of the specified changes. For example, the configuration is such that the printer driver is selected as the location of executing the processing of changing the data of a print job when an item that cannot be handled in the image processing apparatus is present in the content of changes, or when a content of change for which the amount of processing is more than a prescribed amount is present in the content of changes, or when the total amount of processing associated with the changes is more than a prescribed amount of processing, or the like.

[3] The image processing apparatus of Item [2] with the feature that the control section selects the change requesting section when the content of the instruction of change includes a change element which involves image processing and the control section selects the change processing section when the contents of the instruction of change does not include a change element which involves image processing.

In the above preferred embodiment of the present invention, in the contents of the instructed change, if a change element that involves image processing is included, the printer driver of the terminal apparatus is selected as the location of executing the processing of changing the data of the print job. This selection, for example, is ideally suitable when the above image processing cannot be made in the image processing apparatus, or when the processing capacity of the image processing apparatus is not sufficient for carrying out the image processing, or the like.

[4] The image processing apparatus of Item [2] or [3] with the feature that when the control section carries out the selection based on the content of the instruction of change, the control section automatically changes a criterion of the selection according to a processing capacity of the image processing apparatus.

In the above preferred embodiment of the present invention, the selection criterion at the time of selecting based on the contents of the change instruction whether to make the change processing section or the change requesting section carry out the processing is changed automatically, that is, the boundary for discriminating between the items processed in the change processing section and the items processed in the change requesting section are changed automatically according to the processing capacity of that image processing apparatus. For example, the change requesting section is selected if there is at least one item that is an item processed in the change requesting section in the change instruction.

[5] The image processing apparatus of Item [1] with the feature that the control section carries out the selection based on a processing capacity of the image processing apparatus.

In the above preferred embodiment of the present invention, depending on the processing capacity of the image processing section, selection is made of making the apparatus itself (the change processing section) or the printer driver of the terminal apparatus as the location of executing the processing of changing the data of the print job.

[6] The image processing apparatus of Item [4] or [5] with the feature that the control section determines the processing capacity according to a specification of a hardware resource related to a function of the change processing section.

In the above preferred embodiment of the present invention, the location of executing the processing of changing the data of the print job is selected according to the specifications (for example, the operation speed or memory capacity) of the hardware resources (CPU, memory, and others) related to the functions of the change processing section.

[7] The image processing apparatus of any one of Items [4] to [6] with the feature that the control section determines the processing capacity according to an unused processing capacity out of a hardware resource related to a function of the change processing section.

In the above preferred embodiment of the present invention, the location of executing the processing of changing the data of the print job is selected according to the usage ratio of the hardware resources (CPU and memory, for example), or according to the specifications of the hardware resources and their usage ratios related to the functions of the change processing section.

[8] The image processing apparatus of any one of Items [1] to [7] with the feature that the control section confirms a start-up state of the printer driver when the control section selects the change requesting section.

[9] The image processing apparatus of Item [8] with the feature that if the control section cannot confirm that the printer driver has started as a result of the confirmation, the control section carries out control so that the change processing section creates a print job by changing the content of setting of the print job stored in the storage section based on only instruction of change among one or more instructions of change which have been received by the change receiving section, the only instruction of change having been selected to be handled by the change processing section.

[10] The image processing apparatus of Item [8] with the feature that if the printer driver has not started as a result of the confirmation, the control section starts the printer driver.

In the above preferred embodiment of the present invention, when the change requesting section is selected, the start-up state of the printer driver is confirmed, and if it has not started, the printer driver is started from the image processing apparatus.

[11] The image processing apparatus of any one of Items [1] to [10] with the feature that when the printer driver cannot be used, the control section selects the change processing section.

In the above preferred embodiment of the present invention, when the printer driver of the terminal apparatus cannot be used due to communication problems or the like, the image processing apparatus is selected as the location of executing the processing of changing the data of the print job.

[12] The image processing apparatus of any one of Items [1] to [11] further having a transfer section which transfers the print job after the changing to an external printing apparatus for printing.

In the above preferred embodiment of the present invention, the printing of the print job after changing is made to be done by a printing apparatus that is other than that image processing apparatus.

Various types of preferred embodiments of the present invention are described below with reference to the drawings.

FIG. 1 shows a configuration example of a printing system 2 that includes an image processing apparatus 20 according to a first preferred embodiment of the present invention. The printing system 2 is configured from a terminal apparatus 10 such as a personal computer, that is provided with the function of creating print jobs, and a image processing apparatus 20 that is connected to the terminal apparatus 10 via a network 3 (communication lines) such as a LAN (Local Area Network). In FIG. 1, in addition, various types of servers 4 are connected to the network 3. Further, in FIG. 1, although an example has been shown in which one terminal apparatus 10 and one image processing apparatus 20 have been connected, it is also possible to connect pluralities of apparatuses for each apparatus.

The image processing apparatus 20 is an apparatus generally called a digital multifunction peripheral which is provided with the copying function of optically reading out the original document images and printing their copy images on recording sheets, the scanning function of saving the image data of a read out document in a file or transmitting to an external terminal, the printing function of forming images on recording sheets for outputting based on a print job received from a terminal apparatus 10 or the like, and the facsimile function of transmitting and receiving image data, Hereinafter, the image processing apparatus 20 may also be called an MFP.

The image processing apparatus 20 not only stores a print job including the setting contents received from a terminal apparatus 10 after it has been executed (after completion of printing), but is also provided with the function of receiving change operations of the contents of various settings for a print job that has been stored from the user via the operation panel of that image forming apparatus 20. A judgment is made as to whether or not the contents of the changes received from the user can be processed by the apparatus 20, itself. If they can be processed by the apparatus 20, the processing of changing the data of that print job is carried out in the apparatus 20. If they include changes that cannot be processed by the apparatus 20, the contents of the changes are communicated to the terminal apparatus 10 which is the source of transmission of that print job and requests the terminal apparatus 10 to create a print job reflecting the contents of those changes, and receives the created print job from the terminal apparatus 10.

Figure 2:
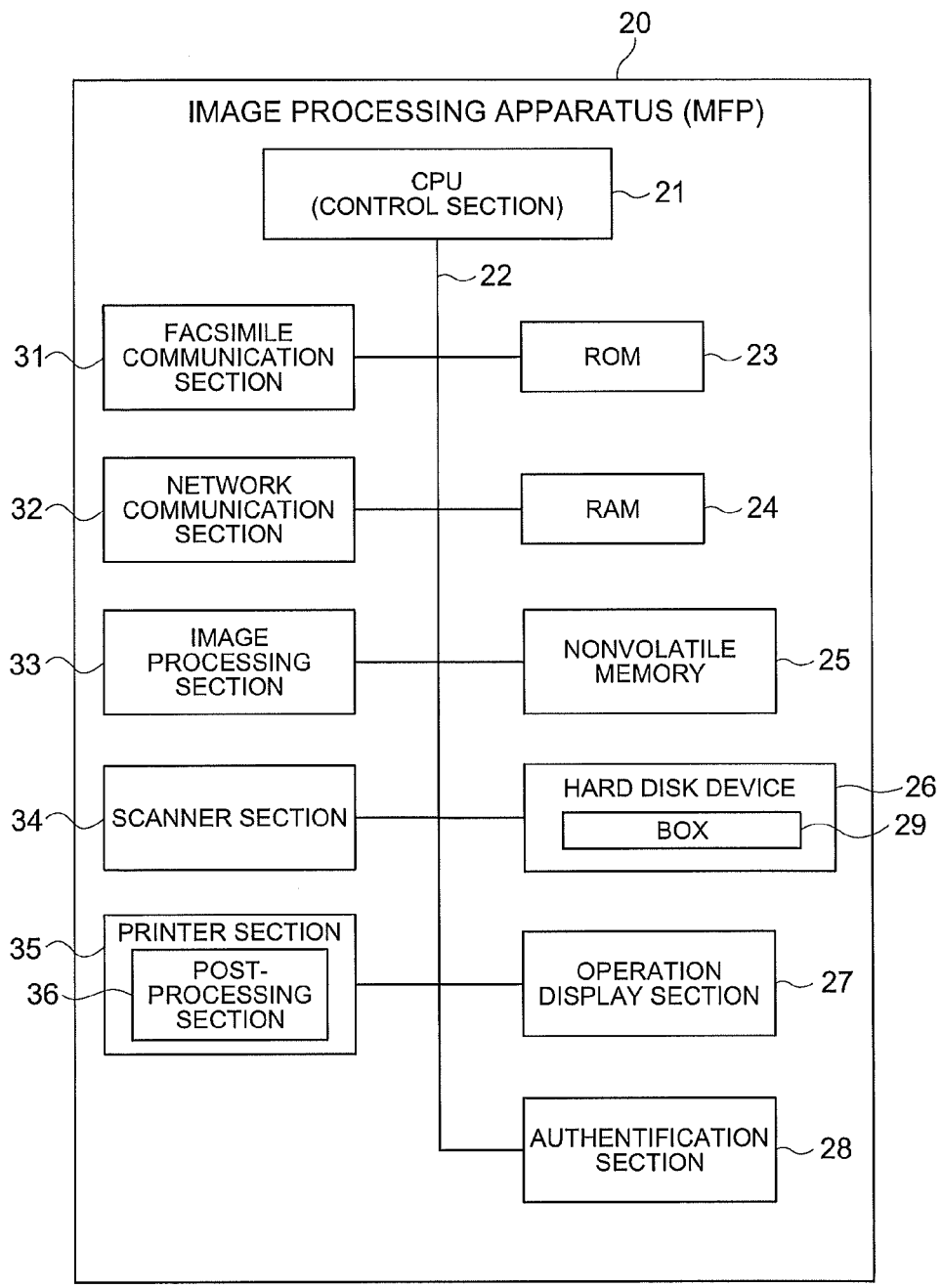
FIG. 2 is a block diagram showing an outline configuration of an image processing apparatus.

FIG. 2 is a block diagram showing an outline configuration of an image processing apparatus 20. An image processing apparatus 20 is configured to have, as a control section that comprehensively controls the operations of that image processing apparatus 20, a CPU (Central Processing Unit) 21 to which are connected via a bus 22, a ROM (Read Only Memory) 23, a RAM (Random Access Memory) 24, a nonvolatile memory 25, a hard disk device 26, an operation display section 27, an authentication section 28, a facsimile communication section 31, a network communication section 32, an image processing section 33, a scanner section 34, and a printer section 35.

The ROM 23 stores various types of programs, and the CPU 21 executes the processing according to these programs and thereby realizes the different functions as the image processing apparatus 20. The RAM 24 is a Random Access Memory that is used as a work memory which the CPU 21 uses for temporarily storing various types of data when it is executing programs, as an image memory for temporarily storing image data, and as a communication buffer for temporarily storing the data related to transmission and reception.

The nonvolatile memory 25 is a rewritable memory whose stored contents are retained even when the power supply to it has been switched off. In the nonvolatile memory 25, the contents of various types of settings set for the image processing apparatus 20, the user information, user authentication information, apparatus ID, system information, specifications related to the hardware of that image processing apparatus 20 (specifications such as the type and operating speed (clock frequency) of the CPU, the memory capacity) are stored. In addition, even the information indicating the usable functions of that image processing apparatus 20 and the status of installations of options are stored in the nonvolatile memory 25. Further, during the initialization processing when the power supply is switched ON, the CPU 21 investigates the hardware configuration of that image processing apparatus 20, and the result of that investigation is stored as the above specifications in the nonvolatile memory 25.

The hard disk device 26 is a large capacity nonvolatile storage device. In the hard disk device 26, print jobs received from the terminal apparatuses 10 and the job execution history of the jobs that have been executed and others are stored. In the hard disk device 26, boxes 29 that are storage areas that are managed for each user or for each group are prepared. In the boxes 29, the data related to print jobs, image data and others are stored. Accesses to the boxes 29 are restricted by passwords or the like. In addition, it is also possible to configure so that the print jobs and execution history are stored in the nonvolatile memory 25.

The operation display section 27 is configured using a liquid crystal display (LCD), a touch panel that is provided on top of its screen and that detects the coordinates of the position which has been pressed, ten keys, and various operation switches such as a start button, and carries out the function of displaying various types of operation screens or setting screens, guidance screens, warning screens or the like, and the function of receiving various types of operations from the user, such as change instructions for the contents of print job settings.

The authentication section 28 has the function of authenticating the users using the image forming apparatus 20, For example, the user authentication is made by receiving input of the user ID and password from the operation display section 27, and by comparing these with the user authentication information that has been registered in advance. Apart from this, it is also possible to have a configuration in which the user authentication is carried out by communicating with a wireless card for personal identification possessed by a user near the image forming apparatus 20 and reading out the user information from this card.

The facsimile communication section 31 carries out communication control for facsimile transmission or facsimile reception, call generation (dialing), call reception, connection with the telephone lines and others.

The network communication section 32 carries out the function of communicating with other MFPs or terminal apparatuses 10 via a network 3 such as a LAN, and of transmitting and receiving various types of data or information apart from print jobs.

The image processing section 33 is provided with functions that carry out rasterizing processing of converting the print data written in PDL (Page Description Language) that is included in a print job received from terminal apparatus into image data (bit map data), compression processing or decompression processing of image data, image rotation processing or others.

The scanner section 34 carries out the function of obtaining the image data by optically reading out an original document. The scanner section 34 is configured to be provided with, for example, a light source that emits light onto an original document, a line image sensor that receives the light reflected from the document and reads out a one line part of the document in the width direction, a movement device that successively moves the reading position in units of lines along the length direction of the document, an optical path that is made of lenses, mirrors, or others, and that guides the light reflected from the document to the line image sensor and forms an image, and a conversion section that converts the analog image signal output by the line image sensor into digital image data.

The printer section 35 carries out the function of printing out the images on a recording sheet according to the image data. Here, this section is configured to have a conveying unit for recording sheets, a photoreceptor drum, a charging unit, a laser unit, a developing unit, a transfer and separating unit, a cleaning unit, and a fixing unit, as a so called laser printer carrying out image formation using an electro-photographic process. It is also possible to use a different style of printer. The printer section 35 is provided with a post-processing section 36 for carrying out post-processing such as punching, folding or stitching for the recording sheets on which images have been printed, adding coversheets or index sheets, sorting and others.

Figure 3:
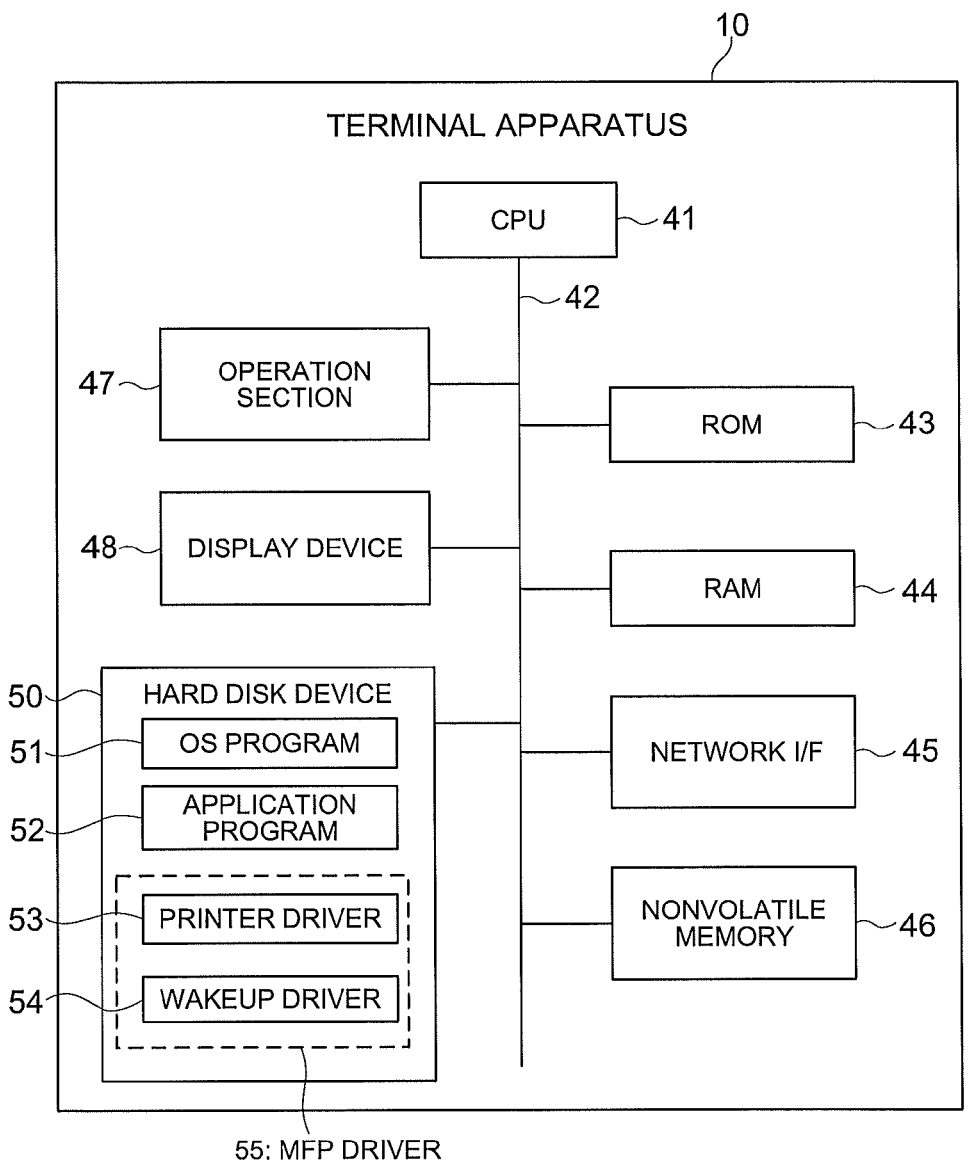
FIG. 3 is a block diagram showing an outline configuration of a terminal apparatus.

FIG. 3 shows an example of the configuration of a terminal apparatus 10. A terminal apparatus 10 can be configured by installing prescribed programs in a general purpose PC (Personal Computer). A terminal apparatus 10 is configured by connecting a ROM 43, a RAM 44, a network I/F section 45, a nonvolatile memory 46, an operation section 47, a display device 48, a hard disk device 50 and others to a CPU 41 via a bus 42.

In the ROM 43, the start-up program that is executed by the CPU 41 and various types of fixed data are stored. In the non volatile memory 46 the user information or user ID of the user using that terminal apparatus 10, user authentication information, identification information of that terminal apparatus 10 (terminal ID), IP address and others are stored.

Further, in the hard disk device 50, apart from the OS (Operating System) program 51, various types of application programs 52 that run under that OS, printer driver 53, wakeup driver 54 and others are stored. The MFP driver which is a driver related to the image processing apparatus 20 is configured to have the printer driver 53 and the wakeup driver 54. When a program such as an application program 52 or the MFP driver 55 is executed, it is read out from the hard disk device 50 and is loaded into the RAM 44, and the CPU 41 executes the programs loaded into the RAM 44.

The operation section 47 is configured from a keyboard, a mouse (pointing device) and others, and receives the input operation of documents, selection and specification of data or files that are the target of printing, various setting operations related to printing and others, from the user. The display device 48 is constituted from a liquid crystal display or the like, and carries out the function of displaying various types of screens such as operation screens, settings screens, warning screens, according to the display data prepared by the printer driver 53, an application program 52, or the OS program 51, or others. The network I/F section 45 carries out the function of transmitting and receiving various types of data via the network 3 with an image processing apparatus 20 or with other terminal apparatuses 10, or others.

In the terminal apparatus 10, when a print instruction or the like is received from the user via an application program 52, that application program 52 or the OS program 51 starts the printer driver 53. The printer driver 53, in its operation screens, receives various types of setting operations related to printing or printing execution instructions from the user. The printer driver 53 carries out the functions of, when it receives the printing execution instruction, creating a print job by converting the data of the document or images specified as the target of printing into data of a PDL format or the like, assigning an identification number to the print job for identifying it, and adding this identification number to the data of the print job, and transmitting it via the network I/F section 45 to the image processing apparatus 20 specified as the destination of printing.

Further, the printer driver 53 is provided with the function of storing the data of the transmitted print job in a prescribed storage area, for a prescribed period while establishing correspondence between the data and the identification number assigned to it. Further, when a creation request for a print job in which the contents of the setting such as printing condition have been changed is received from the image processing apparatus 20 for this stored print job, it has the function of creating a print job according to that request and transmitting it to the image processing apparatus 20.

The data of the print job created by the printer driver 53 is constituted from the image related data stipulating the contents of the image to be printed, and output setting parameters that stipulate the finishing of the printed material such as punching or stapling, and the number of print copies. The image related data is constituted from vector data that indicates the contents of image drawing, or the like.

The printer driver 53 carrying out functions like these ends automatically after completion of transmission of the print job, and shifts to a state in which it does not exist as a task (the state in which the printer driver task has been deleted).

The wakeup driver 54 is started in the initialization processing, or the like, which is executed after the OS program 51 is started. This is a program that becomes resident in the terminal apparatus 10 in the state of having been started up. Whenever the terminal apparatus 10 is operating, the wakeup driver 54 has the "function of monitoring whether or not the printer driver 53 is in the started-up state", and the "function of receiving a start-up request of the printer driver 53 from the image processing apparatus 20", and when a start-up request of printer driver 53 is received from the image processing apparatus 20, it carries out the processing of starting the printer driver 53, if the printer driver 53 is not in the started-up state.

The monitoring of whether or not the printer driver 53 is in the started-up state is carried out, for example, as follows.

(1) When the printer driver 53 is started, it informs the wakeup driver 54 that it has shifted to the started-up state (start-up present).

(2) When the printer driver 53 goes into the pre-start state due to deletion processing, it informs the wakeup driver 54 about the state.

Because the wakeup driver 54 sets the printer driver start-up status flag to ON indicating the started-up state or to OFF indicating the pre-start state based on the notices of (1) and (2) above, by checking the printer driver start-up status flag, whether or not the printer driver 53 is in the started-up state is grasped.

Further, the case when the printer driver 53 goes into the pre-start state after having been started (the state in which it does not exist as a task) includes (a) When it ends automatically (normal end) after completing the transmission of a print job, (b) when an ending operation of printer driver 53 is received from the user, and (c) when deleted by the OS program 51 due to some error or the like.

Next, the operations are described for the case when the image processing apparatus 20 receives setting change operations from the user via the operation display section 27 for a print job that has been received from the terminal apparatus 10 and has been stored.

FIG. 4 shows the flow of the above operations. The printer driver 53 of the terminal apparatus 10 creates a print job and transmits it to the image processing apparatus 20 (Step S101), and is terminated automatically when this transmission is completed. In detail, the terminal apparatus 10 assigns an identification number to the created print job, and not only transmits the print job provided with that identification number to the image processing apparatus 20, but also stores that print job while establishing correspondence between it and the identification number. Further, the terminal apparatus 10 deletes a stored print job after a prescribed period of time, or if the number of stored print jobs exceeds a prescribed number, the terminal apparatus 10 deletes them starting from the oldest job, further or deletes a print job if a deletion instruction is received from the image processing apparatus 20.

As has been explained above, even after the printer driver 53 has ended (deleted), the wakeup driver 54 is resident in the terminal apparatus 10. The image processing apparatus 20 receives the print job transmitted from the terminal apparatus 10, stores the data of the received print job while establishing correspondence between it and the identification number in the nonvolatile memory 25 or in the hard disk device 26 (Step S201). In addition, it executes printing based on that received print job (Step S202), and when that execution is completed, registers and stores the contents of settings of that print job as the execution history of that print job (Step S203).

As the execution history, for each job, the source of setting of that job is registered while establishing correspondence between it and the contents of settings of that job. If it is a print job received from a terminal apparatus 10, the source of setting is the terminal apparatus 10 which the source of transmission of that print job, and in concrete terms, the identification information (for example, the IP address or the apparatus ID) of the terminal apparatus 10 is registered as the information indicating the source of setting. If it is a copy job, the source of setting is taken as this image processing apparatus 20. The contents of settings of the job that are registered in the execution history are, if the job is a print job, they are the contents of settings of the received print job, and are for example, the contents of settings related to the image related data or the output setting parameters. If the job is a copy job, they are the original document size, resolution, color/monochrome, double-sided/single-sided, number of copies, and other contents of settings received from the user at the time that the copy job is inputted.

After that, the image processing apparatus 20 receives from the user, change instructions for the contents of settings of a printed print job whose printing has been already completed and which has been stored in the hard disk device 26 via the operation display section 27 (Step S204).

For example, the image processing apparatus 20, based on the stored execution history, displays the execution history screen 60 such as that shown in FIG. 5 in the operation display section 27, and receives, from the user, the selection operation of a print job which is the target of the settings change from among the print jobs displayed in this screen 60. In the execution history screen 60 of FIG. 5, a selective display is being made of only the execution history of the jobs inputted by the user authenticated by the authentication section 28 (the currently logged in user). In the execution history screen 60 of FIG. 5, the information (source of settings and contents of settings) related to one job is displayed in one horizontal line. When the user presses the display area of the desired job, that job goes into the selected state. If the OK button 61 is pressed when any job is in the selected state, that job is determined to be the target of setting changes.

Figure 6:
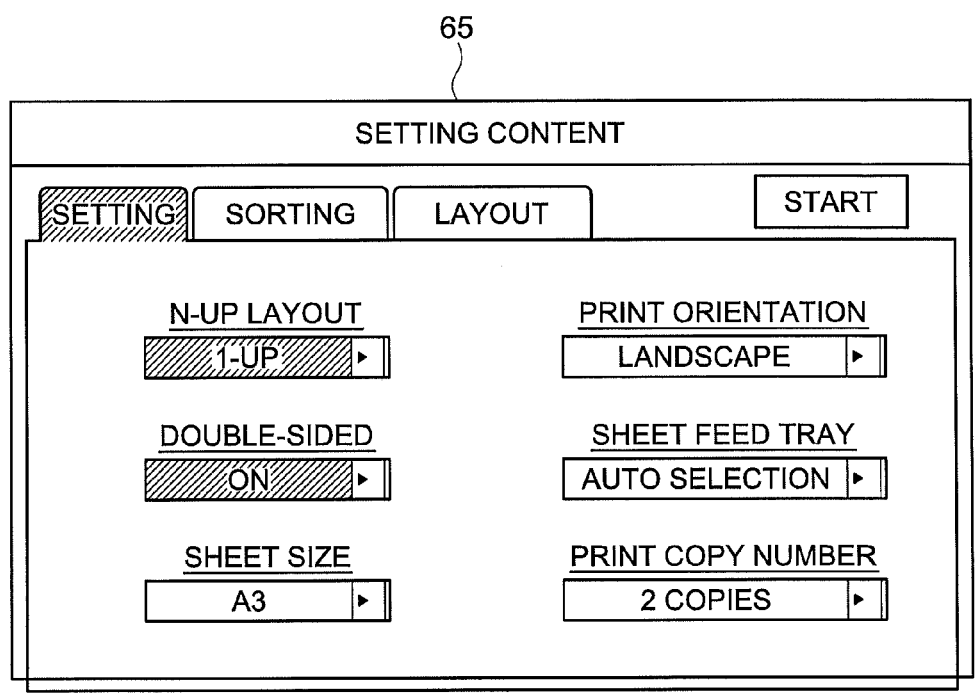
FIG. 6 is a front view diagram showing an example of the setting changing screen.

When a settings change target job is determined, as a screen for receiving from the user the settings change operations for the job, for example, the setting change screen 65 such as the one shown in FIG. 6 is displayed on the operation display section 27. In the settings change screen 65 of FIG. 6, the changed items are displayed with slant lines, and this is an example in which the No. 1 print job 62 of FIG. 5 is taken as the target of change. The setting "2 in 1" has been cancelled in "N-up layout", and "Double-sided" has been changed to ON.

After the contents of setting change instructions are received from the user, if an execution instruction is received for that print job, the image processing apparatus 20 selects the location of executing the processing of changing the data of the print job corresponding to the contents of the change instruction (hereinafter, refer to as the job re-creation processing) (FIG. 4: Step S205). In the print job re-creation processing, either the data of the print job before changing is modified, or else the print job after changing is created as a job different from the print job before changing.

FIG. 7 is one example of a control table 70 for change elements showing the relationship between the change elements (items) whose settings can be changed through the settings change screen 65, or the like, and the execution location of the print job re-creation processing for each change element. Here, the execution location of the print job re-creation processing for change elements that require changing of the image related data is taken as "Terminal" (the terminal apparatus 10), and the execution location of the print job re-creation processing is taken as "MFP" (the image processing apparatus 20) for the change elements that do not require changing of the image related data, that is, for the change elements that can be handled by only changing the output setting parameters such as the finishing of the printed material such as punching or stapling, or the number of copies printed.

Among the change elements, "16 in 1", "8 in 1", or the like, are the settings related to the N in 1 function of fitting the images of a plurality of pages in one page. The setting "16 in 1" is the setting of fitting the images of 16 pages in one page, and the setting of "8 in 1" is the setting of fitting the images of 8 pages in one page. The "Page unit setting" is the setting of the function of inserting a blank page between pages. The "Front/rear cover sheet" is the setting of adding a front cover sheet or rear cover sheet, while "Chaptering" is the function of inserting sheets for separating chapters (index sheets) between pages.

The image processing apparatus 20 according to the first preferred embodiment is not provided with the function of executing the print job re-creation processing for change elements requiring changing of the image related data. Therefore, among the change instructions received from the user, when at least one change element (changes that require the changing of the image related data) is included for which the execution location is "Terminal" in the control table 70, the image processing apparatus 20 selects "Terminal" as the execution location of the print job re-creation processing, and selects "MFP" in all other cases.

Figure 8A:
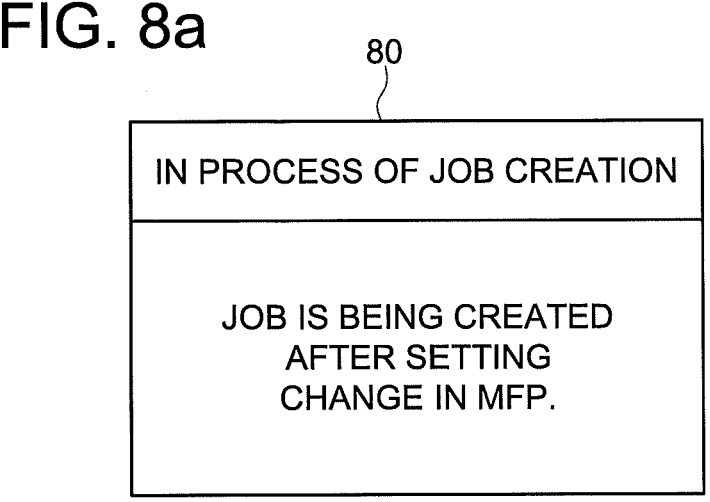
FIGS. 8a and 8b are explanatory diagrams showing a screen during job creation and a screen during job transmission.

When the selected execution location is "MFP" (FIG. 4: NO in Step S206), the CPU 21 carries out the print job re-creation processing by the CPU 21 itself, creates and stores (Step S207) the print job corresponding to the change instruction (refer to as the updated print job). During the execution of the print job re-creation processing, as is shown in FIG. 8a, the job creation in-progress screen 80 is displayed in the operation display section 27 of the image processing apparatus 20 for informing the user that the image processing apparatus 20 is carrying out the re-creation of the print job corresponding to the change instructions. After that, printing is executed based on that created updated print job (FIG. 4: Step S211), and when the execution is completed, the contents of those settings or others, are registered and stored as the execution history (Step S212), and the processing is ended.

When the selected execution location is "Terminal" (YES in Step S206), the CPU 21 transmits a start-up request of the printer driver 53 to the terminal apparatus 10 which is the source of transmission of that print job (Step S208). The wakeup driver 54 of the terminal apparatus 10 that has received the start-up request finds out if the printer driver 53 has been started or not starts it if it has not been started, returns the response of start OK to the image processing apparatus 20, and if it is already in the started-up state, returns as it is, the response of start OK to the image processing apparatus 20 (Step S103). Further, if communication with the terminal apparatus 10 is not possible, or if the printer driver 53 is not started, because the start OK response is not received, the generation of an error is detected by the image processing apparatus 20.

When the image processing apparatus 20 receives the start OK response of the printer driver 53 from the terminal apparatus 10, it transmits to the printer driver 53 of the terminal apparatus 10 the change information about the contents of changes related to the current change instruction (or the information about all the setting contents of that print job including the changed contents) (Step S209).

The printer driver 53 of the terminal apparatus 10 having received this information carries out print job re-creation processing according to the received information thereby creating the print job (Step S104), and transmits that created print job (updated print job) to the image processing apparatus 20 (Step S105). Further, when the above error is detected, measures are taken in the image processing apparatus 20 of executing the print job re-creation processing for change elements that can be executed in the image processing apparatus 20.

Figure 8B:
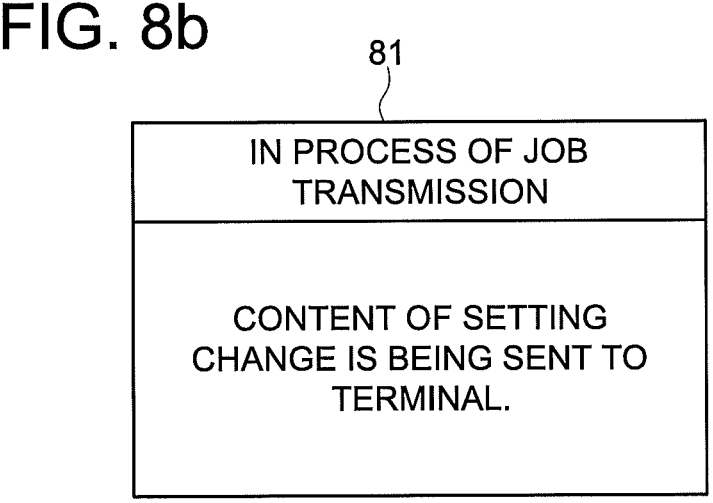

The image processing apparatus 20 not only receives and stores the created updated print job (Step S210), but also executes printing based on that received updated print job (Step S211), and when the execution is completed, registers and stores the contents of those settings and others, as the execution history (Step S212), and ends the processing. Further, the image processing apparatus 20, from Step S208 to Step S210 during the period until the completion of reception of the print job, displays the job transmission in-progress screen 81 in the operation display section 27 indicating that it is making the printer driver 53 of the terminal apparatus 10 is being made to carry out the print job re-creation processing, as is shown in the example in FIG. 8*b*.

The printing in Step S211 is carried out by the printer section 35 that is possessed by the image processing apparatus 20, or else, it transfers the print job after changing to a designated external printing apparatus, and can make that printing apparatus carry out the printing. Where the printing is done is specified from the operation display section 27.

The above printing function for transferring, for example, is convenient for making a trial printing of only one copy in a low speed printer near the user, verifying the printed contents, and changing the contents of settings (for example the number of copies printed out), and printing in a high speed printer installed at a distant location.

FIG. 9 shows one example of the execution history screen 60B after executing printing upon making the setting changes of changing from single-sided to double-sided and canceling "2 in 1" printing for the No. 1 print job 62 in the execution history screen 60 of FIG. 5. In FIG. 9, the display of "2 in 1" which was present in the contents of settings column of the No. 1 job of FIG. 5 has been deleted, and also, "Single-sided" has been changed to "Double-sided".

Further, in the above example, when the contents of settings of a print job whose printing has been already completed are changed and printing of the job is carried out again, although the contents of the execution history of that print job are overwritten here, it is also possible to additionally register the print job after changing in the execution history as a new print job. Further, a print job that has been stored in a hard disk device 26 or the like, may be deleted when a prescribed time has elapsed after the execution of that print job, or the print jobs can be deleted successively starting from the oldest when a predetermined storage area has become full (or when the number of print jobs stored exceeds a prescribed number). In addition, similar to the execution history, when a settings change is received, it is possible to store in the hard disk device 26 only the data of the print job after making those setting changes, or it is possible to have a configuration so as to store both the print jobs before changing and alter changing as separate print jobs.

Next, Explanation is made for the operations shown in FIG. 4 in more detail.

FIG. 10*a* shows an example of the data structure of the Command signal and others used in the communication between the terminal apparatus 10 and the image processing apparatus 20. The Command signal is constructed of a Header 91, an Identical Code 92, a parameter 93, and any desired number of accessory data 94. The Command signal is a signal that is transmitted from the image processing apparatus 20 to the terminal apparatus 10. The result of processing in response to the Command signal is transmitted as a Result signal from the terminal apparatus 10 to the image processing apparatus 20. Even the Result signal has a data structure similar to that of the Command signal.

FIG. 10*b* shows the details of the information stored in different areas of the Command signal or others. The Header 91 indicates the attribute (type) of that signal (packet). The Identical Code 92 indicates the detailed classification among the signals having the attribute (type) indicated by the Header 91. For example, it indicates the type of operation. In the Ack signal, the Identical Code 92 indicates which operation of a Command signal the Ack signal is a response to. In a Result signal, the Identical Code 92 indicates which operation of a Command signal the Result signal is a response to. The parameter 93 indicates the contents of communication result in a Result signal (normal, error type or others). The individual data to be sent (contents of changes, contents of settings, print job data or other) are stored in the area of the accessory data 94.

Figure 12:
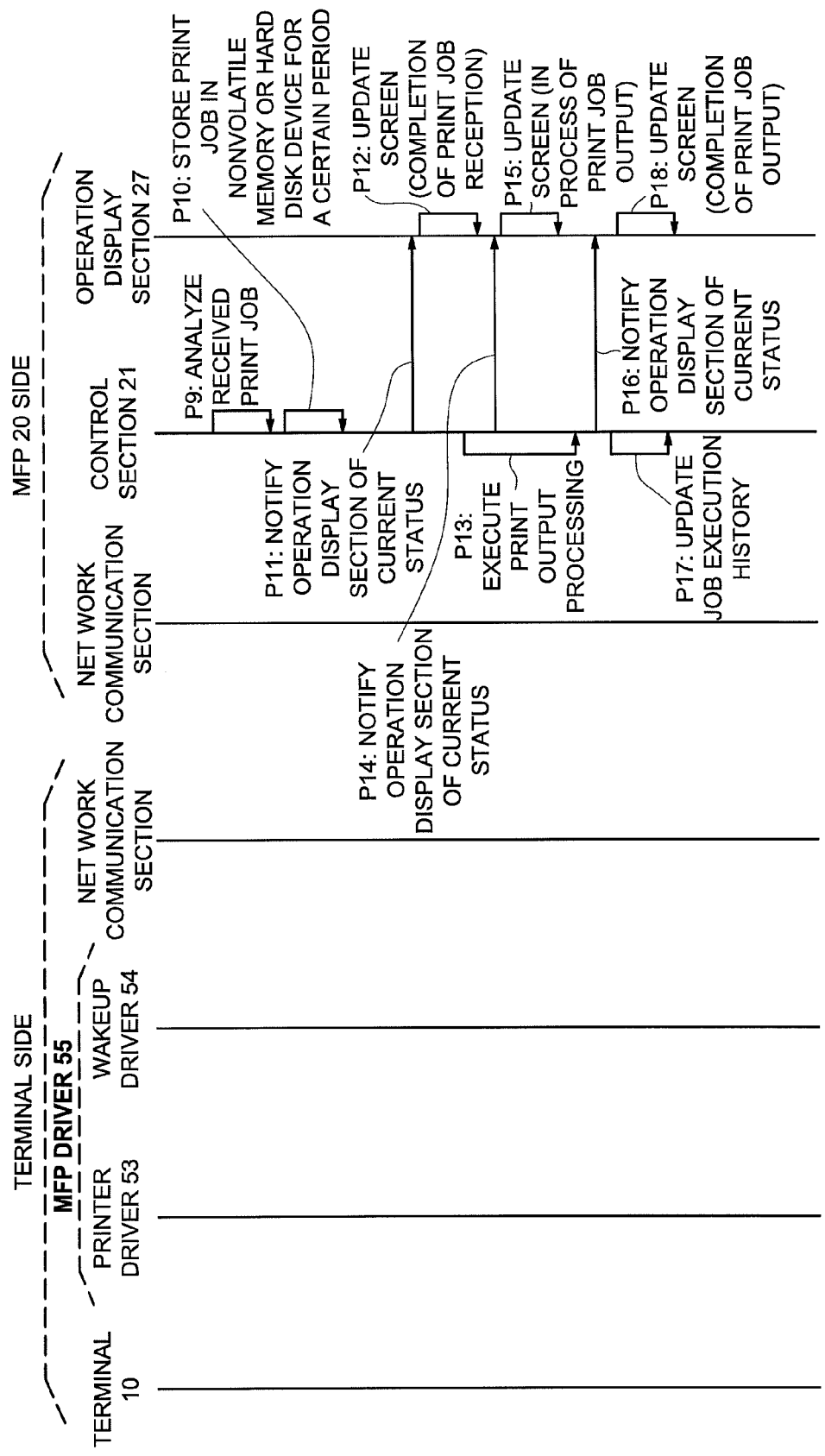
FIG. 12 is an explanatory diagram showing the operation sequence subsequent to FIG. 11.

⟨Operation Sequence 1⟩ FIG. 11 and FIG. 12 show the operation sequence (the operation sequence 1) from transmitting a first print job from a terminal apparatus 10 to the image processing apparatus 20 until printing (corresponds to Steps S101, S102 and Steps S201 to S203 of FIG. 4).

The OS program 51 or an application program 52 of the terminal apparatus 10 outputs a start request to the printer driver 53 at the time of executing printing (FIG. 11: P1). When the printer driver 53 starts (P2) because of the request and when the starting-up is completed, information on this fact is given to the wakeup driver 54 (P3). Upon receiving this notice, the wakeup driver 54 updates the printer driver start-up status flag to ON (started-up state) (P4).

Next, the printer driver 53 displays the settings screen in the display device 48 of the terminal apparatus 10, and receives various types of settings related to the print job (P5), and then when the print job setting completion operation is received (P6), it creates the data for the print job (P7). In other words, it creates the data of a print job that includes the image related data (data in the PDL format) stipulating the contents of the images to be printed, and the output setting parameters that stipulate the finishing of the printed matter such as punching or stapling, and the number of copies to be printed. At this time, an identification number is allocated to that print job, and the data of that print job and the identification number are stored while establishing correspondence between them.

The printer driver 53 transmits this created print job data (includes the image related data, output settings parameters and others) and its identification number to the image processing apparatus 20 of the printing destination via the network I/F section 45 (P8). The data of the print job and the identification number are received by the network communication section 32 of the image processing apparatus 20, and sent to the CPU 21 (control section). The CPU 21 (control section) analyzes the received print job (FIG. 12: P9). Further, it stores the data of that print job and the identification number while establishing correspondence between them in either the nonvolatile memory 25 or in the hard disk device 26 (P10). Further, as has been described above, the stored print job is deleted when a prescribed time has elapsed after the execution of that print job or the print jobs are deleted successively starting from the oldest when a predetermined storage area has become full (or when the number of print jobs stored exceeds a prescribed number).

The CPU 21 informs the operation display section 27 about the current status (completion of receiving a print job) (P11), and the operation display section 27 having received this information displays the print job reception completion screen (P12). Further, the CPU 21, executes the printing related to the received print job (P13), and notifies the operation display section 27 about the current status (printing in progress) (P14). The operation display section 27 having received this notice displays the printing in-progress (outputting) screen (P15). The CPU 21, when the printing is completed, after notifying the operation display section 27 about the printing completed status (P 16), stores (updates) the execution history of that print job (P17). The operation display section 27 displays the printing completion screen upon receiving the printing completion status (P18).

Figure 13:
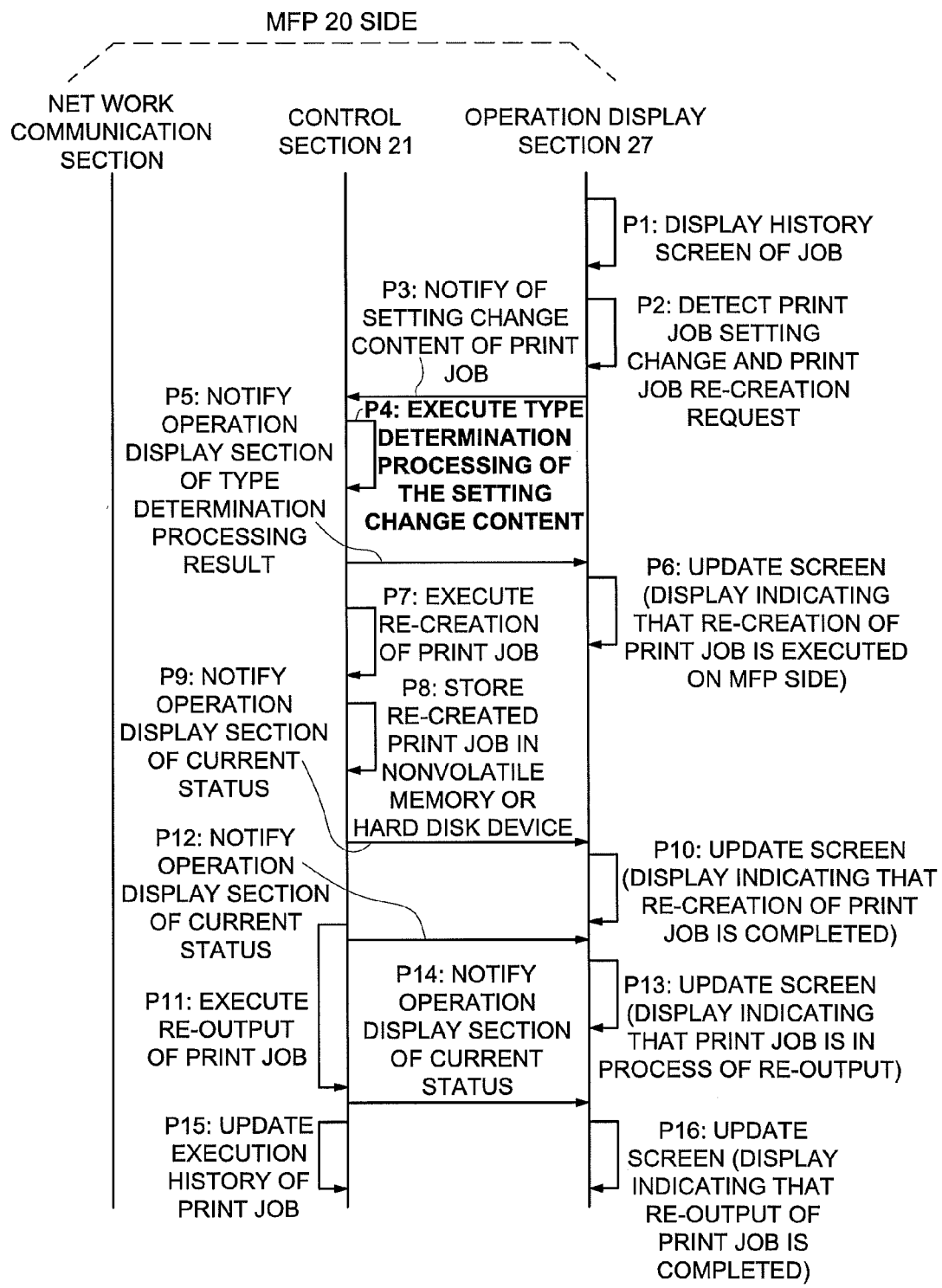
FIG. 13 is an explanatory diagram for the case of receiving setting change operations for a print job whose printing has been completed, and shows the operation sequence (the operation sequence 2) in which the job re-creation processing corresponding to the setting changes is carried out in the image processing apparatus.
Figure 14:
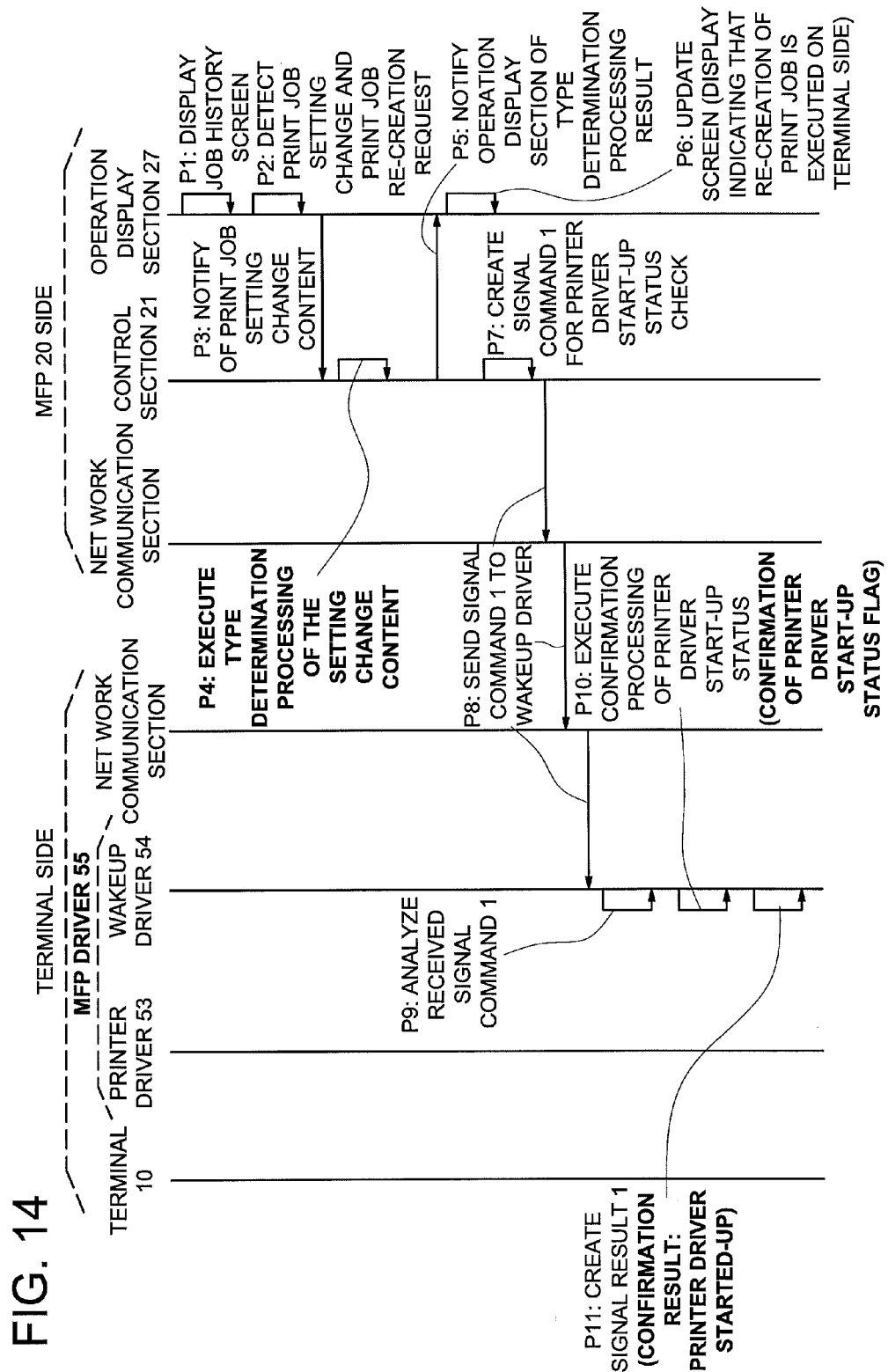
FIG. 14 is an explanatory diagram for the case of making the printer driver of the terminal apparatus carry out the print job re-creation processing and shows the operation sequence (the operation sequence 3) when the printer driver has been started up.

⟨Operation Sequence 2⟩ FIG. 13 shows the operation sequence (the operation sequence 2) for the case of receiving the settings change operations from the user via the operation display section 27 for a stored print job, and carrying out the corresponding print job re-creation processing in the image processing apparatus 20 (corresponds to Steps S204 to S207, S211, and S212 in FIG. 4).

When the prescribed operation for displaying the execution history is received, the operation display section 27 displays an execution history screen 60 like the one shown in FIG. 5 (P1), receives the selection of the print job which is to be the target of settings change, receives the change operations of setting contents for that print job via the settings change screen 65 like one shown in FIG. 6 (P2), and notifies the CPU 21 about the contents of those changes (P3).

The CPU 21 which has received this notice, based on the contents of the change instruction, judges the execution location of the print job re-creation processing corresponding to that change instruction (P4), and notifies the operation display section 27 about that determination result (in this case, the MFP is the location) (P5). The operation display section 27, displays a screen indicating that the print job re-creation processing will be made by the image processing apparatus 20 (for example, the print job creation in-progress screen 80 of FIG. 8*a*) (P6).

The CPU 21, executes the print job re-creation processing corresponding to the change instruction (P7), and when that execution is completed, stores the re-created print job in the nonvolatile memory 25 or in the hard disk device 26 (P8). In addition, it sends the completion notice to the operation display section 27 (P9), and the operation display section 27 having received that notice displays a prescribed screen indicating that the re-creation of the print job has been completed (P 10). Further, the CPU 21 executes the printing related to that re-created print job (updated print job) (P11), and informs the operation display section 27 about the current status (printing in progress) (P12). The operation display section 27 having received this displays the re-printing in-progress screen for the print job (P13). When the printing for the updated print job is completed, after informing the operation display section 27 about the printing completed status (P14), the CPU 21 updates the execution history of that print job or additionally registers in it (P15). The operation display section 27 displays the re-printing completion screen upon receiving the printing completed status (P16).

Next, explanation for various cases will be given about the operation sequence when requesting the terminal apparatus 10 to carry out the print job re-creation processing (corresponds to Steps S204 to S206, S103 to S10S, and S208 to S212 in FIG. 4).

⟨Operation Sequence 3⟩ When requesting the terminal apparatus 10 to carry out the print job re-creation processing and when the printer driver 53 of that terminal apparatus 10 has been started-up.

FIGS. 14, 15, 16, and 17 show the operation sequence 3. When the prescribed operation for displaying the execution history is received, the operation display section 27 displays an execution history screen 60 such as the one shown in FIG. 5 (FIG. 14: P1), receives the selection of the print job which is to be the target of settings change, receives the setting content change operations for that print job via the settings change screen 65 like one shown in FIG. 6 (P2), and notifies the CPU 21 about the contents of those changes (P3).

The CPU 21 which has received this notice, based on the contents of the change instruction, judges the execution location of the print job re-creation processing corresponding to that change instruction (P4), and sends that determination result (execution in the terminal) to the operation display section 27 (P5). The operation display section 27, displays a screen indicating that the print job re-creation processing will be made in the terminal apparatus 10 (for example, the job transmission in-process screen 81 of FIG. 8*b*) (P6).

The CPU 21 prepares a signal Command 1 for checking the start-up state of the printer driver 53 (P7), and transmits this to the wakeup driver 54 of the terminal apparatus 10 (P8).

When the wakeup driver 54 of the terminal apparatus 10 receives the signal Command 1, it analyzes it and recognizes that it is a request for checking the start-up state (P9), and checks whether or not the printer driver 53 has been started by checking the printer driver start-up status flag (P10). In this operation sequence 3, since the printer driver 53 is in the started-up state, it creates a signal Result 1 indicating that the printer driver 53 is in the started-up state (P11), and transmits this to the image processing apparatus 20 (FIG. 15: P12).

The CPU 21 of the image processing apparatus 20 that has received the signal Result 1 via the network communication section 32, analyzes this signal (P 13), and recognizes that the printer driver 53 is in the started-up state. Next, it notifies the operation display section 27 about the current status (printer driver start-up confirmed) (P14). The operation display section 27 having received this makes a display indicating the fact that the printer driver has started (P15).

Next, the CPU 21 generates a re-creation request as the signal Command 3 including the information identifying the print job that has been specified as the target for changes (the identification number that has been stored connected with that print job) and the information indicating the contents of those changes (P16), and transmits this to the printer driver 53 of the terminal apparatus 10 (P17).

The printer driver 53 analyzes the received signal Command 3 (P18), and recognizes the print job that is the target of changes and the contents of the changes. The print job that is the target of change is recognized from the identification number included in the signal Command 3. After that, the printer driver 53 prepares the signal Ack 3 indicating that the signal Command 3 has been received normally (P19) and transmits it to the image processing apparatus 20 (P20).

The CPU 21 of the image processing apparatus 20 analyzes the received signal Ack 3 (P22), and sends the information that the print job re-creation is in progress in the terminal apparatus 10 to the operation display section 27 (P23). The operation display section 27 having received this notice displays a screen indicating that the print job re-creation is in progress in the terminal apparatus 10 (P24).

Figure 15:
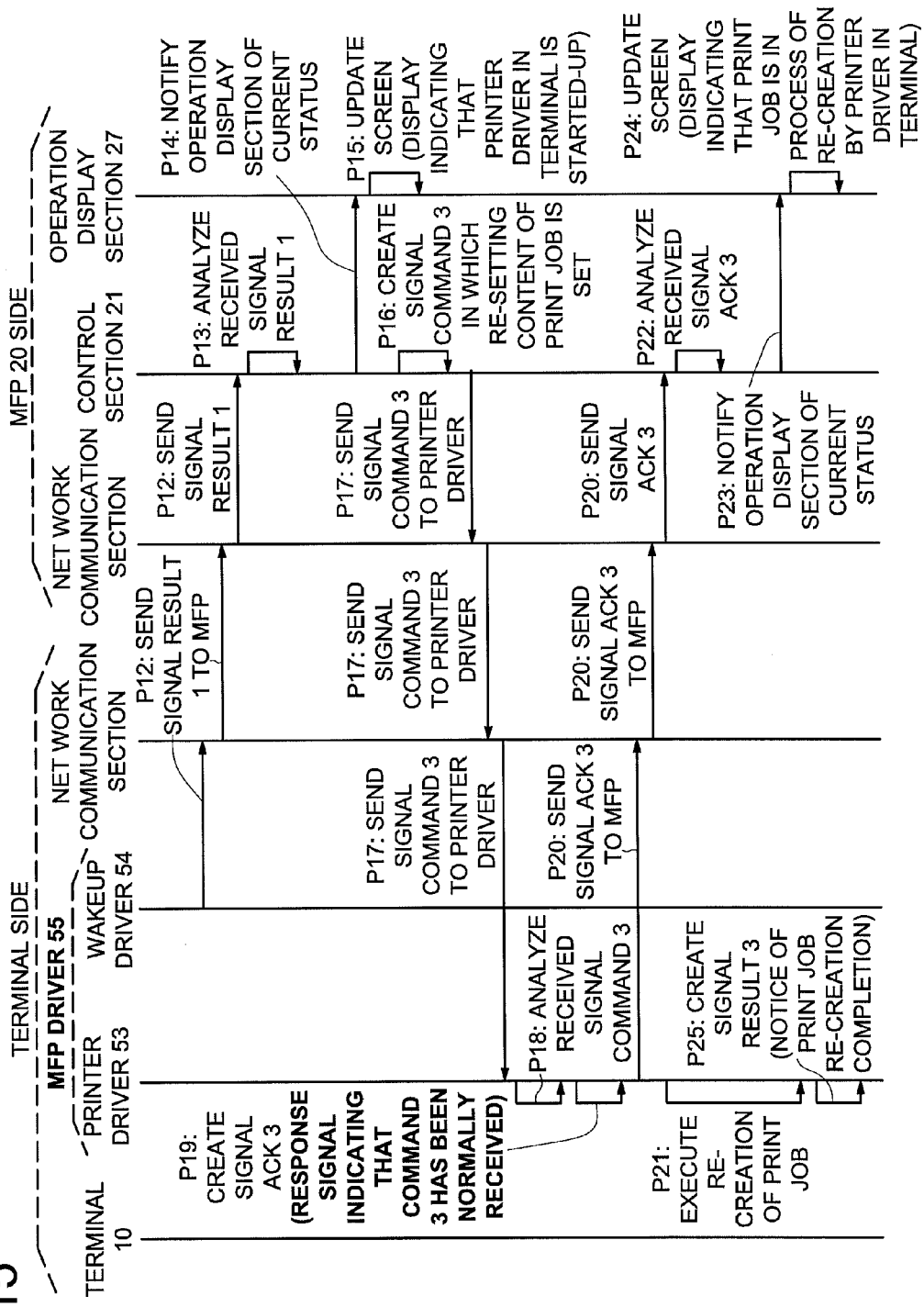
FIG. 15 is an explanatory diagram showing the operation sequence subsequent to FIG. 14.
Figure 16:
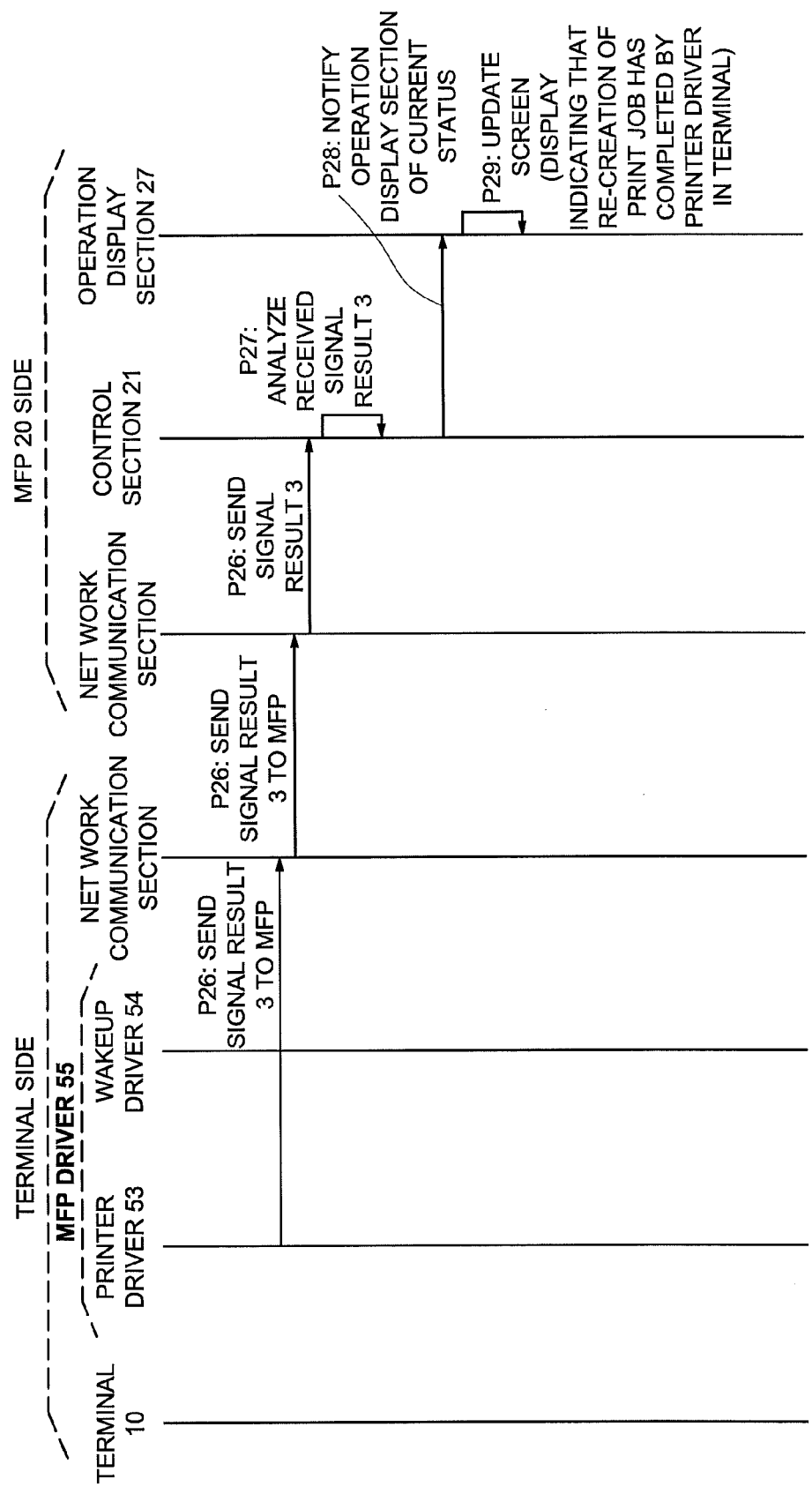
FIG. 16 is an explanatory diagram showing the operation sequence subsequent to FIG. 15.

The printer driver 53 of the terminal apparatus 10, for the print job that is the target of changes and that has been recognized in P18 of FIG. 15, creates the print job in which the changes indicated by the contents of changes recognized in P18 have been incorporated (P21). In detail, the print job re-creation processing is carried out by creating a print job in which the contents of changes recognized in P18 have been incorporated in the data of the print job stored corresponding to that recognized identification number. When the preparation of the print job is completed, the signal Result 3 indicating that the re-creation has been completed is prepared (P25), and this is transmitted to the image processing apparatus 20 (FIG. 16: P26).

The CPU 21 of the image processing apparatus 20 that has received the signal Result 3 analyzes it (P27), and gives notice of the current status (re-creation completed in the terminal apparatus 10) to the operation display section 27 (P28). The operation display section 27 having received this makes a display indicating the fact that the re-creation of the print job in the terminal apparatus 10 has been completed (P29).

Figure 17:
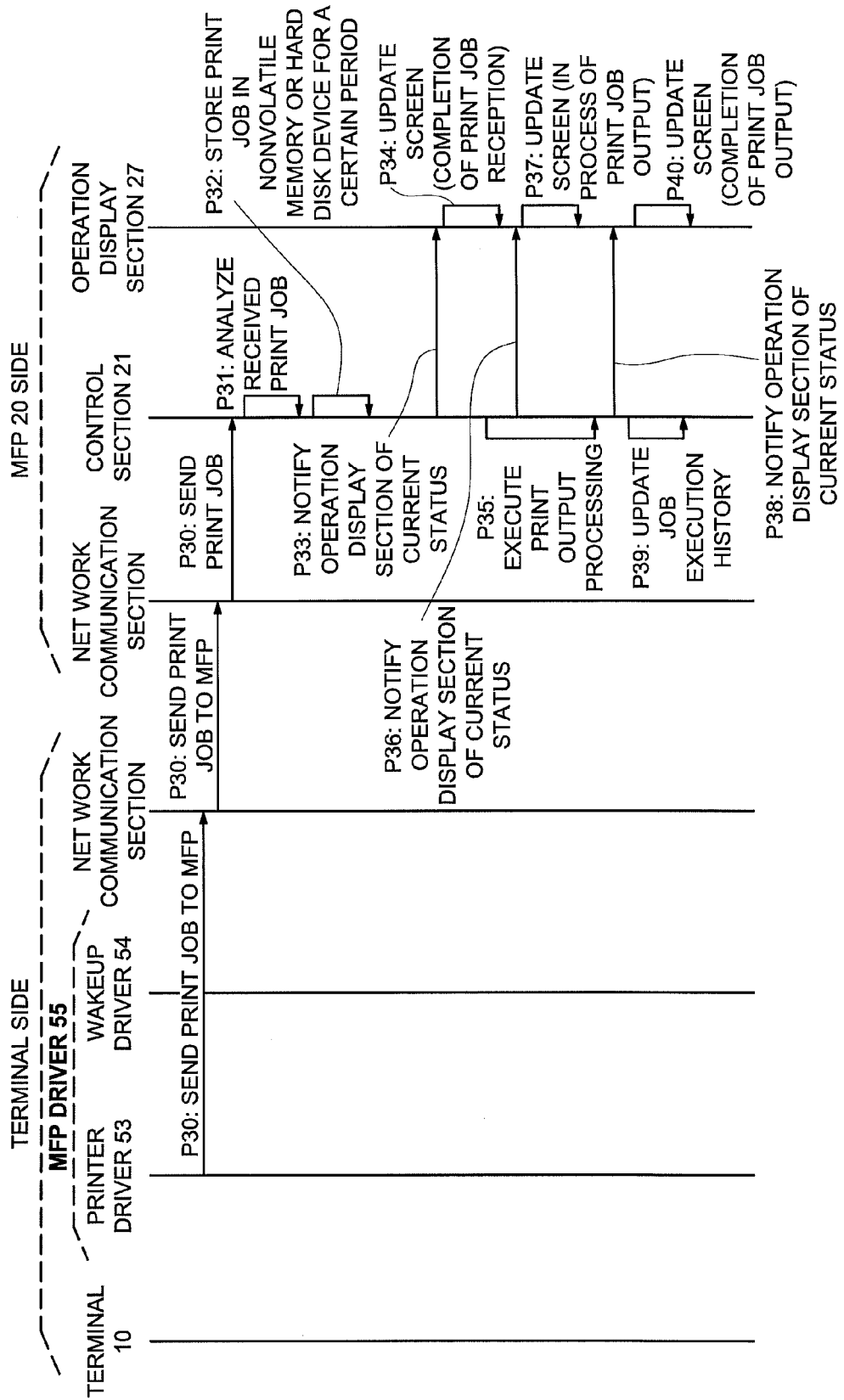
FIG. 17 is an explanatory diagram showing the operation sequence subsequent to FIG. 16.

After that, the printer driver 53 of the terminal apparatus 10 transmits the prepared print job to the image processing apparatus 20 (FIG. 17: P30).

The image processing apparatus 20 analyzes the received data of the print job (P31), and stores the received print job in the nonvolatile memory 25 or in the hard disk device 26 (P32). Further, as has been explained above, the stored print job is deleted when a prescribed time has elapsed after the execution of that print job or the print jobs are deleted successively starting from the oldest when a predetermined storage area has become full (or when the number of print jobs stored exceeds a prescribed number).

The CPU 21 gives notice of the current status (reception completed of the updated print job) to the operation display section 27 (P33), and the operation display section 27 having received this notice displays an updated print job reception completion screen (P34). Further, the CPU 21 executes the printing related to the received updated print job (P35), and gives notice of the current status (updated print job printing in progress) to the operation display section 27 (P36). The operation display section 27 having received this notice displays the updated print job printing in-progress screen (P37). The CPU 21, when the printing of the updated print job is completed, after giving notice of the printing completed status to the operation display section 27 (P38), stores the execution history of that print job (P39). The operation display section 27 displays the printing completion screen upon receiving the printing completed status (P40).

Further, the configuration can be such that the original print job can be replaced by the updated print job, or else, the updated print job is stored as a new print job. In the latter case, the printer driver 53 of the terminal apparatus 10 assigns a new identification number and not only stores the data of the updated print job while establishing correspondence between the data and this new identification number, but also, transmits the updated print job to the image processing apparatus 20 while adding that identification number to it. In the image processing apparatus 20, this updated print job is stored while establishing correspondence between the job and the identification number in the nonvolatile memory 25 or in the hard disk device 26.

⟨Operation Sequence 4⟩ The first example of when requesting the terminal apparatus 10 to carry out the print job re-creation processing and when the printer driver 53 of that terminal apparatus 10 has not been started:

FIGS. 18, 19, 20, and 21 show the operation sequence 4. The basic operations are the same as in the operation sequence 3. The points of difference are the following.

Figure 18:
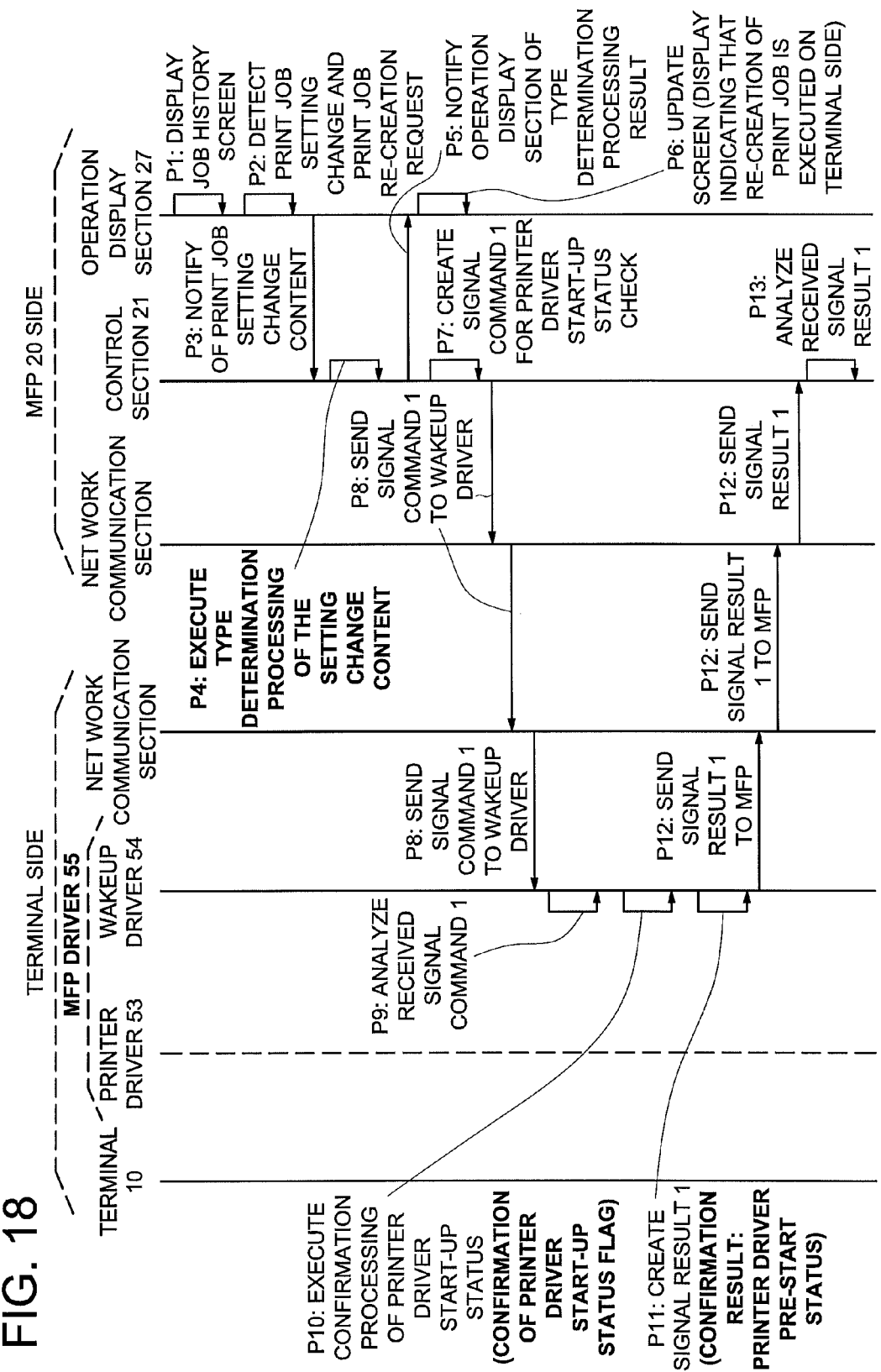
FIG. 18 is an explanatory diagram for the case of making the printer driver in the terminal apparatus carry out the print job re-creation processing and shows the operation sequence (the operation sequence 4) of a first example when the printer driver has not been started up.

As the response for the printer driver start-up state check request (signal Command 1, FIG. 18: P8), the signal Result 1 indicating that the printer driver has not started is returned from the terminal apparatus 10 to the image processing apparatus 20 (FIG. 18: P12).

Figure 19:
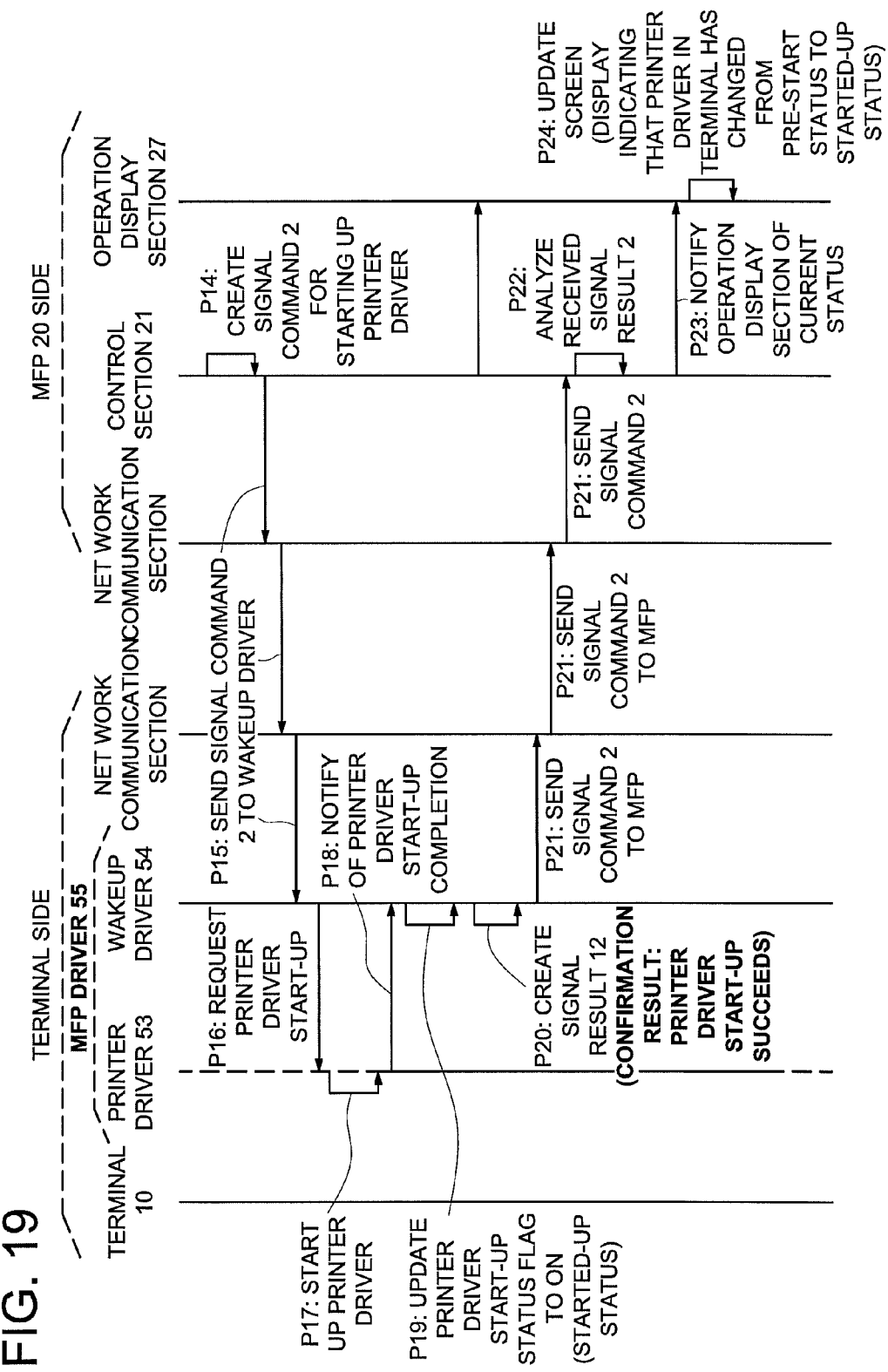
FIG. 19 is an explanatory diagram showing the operation sequence subsequent to FIG. 18.

The image processing apparatus 20 that has received this, prepares the signal Command 2 that is a starting request of the printer driver 53 (FIG. 19: P 14), and transmits it to the wakeup driver 54 of the terminal apparatus 10 (P15). The wakeup driver 54 having received this starting request starts the printer driver 53 (P16, P17). The started printer driver 53 gives the starting completion notice to the wakeup driver 54 (P18), and the wakeup driver 54 having received this notice not only updates the printer driver start-up status flag to ON (started-up state) (P19), but also prepares the signal Result 2 indicating that the starting of the printer driver has been successful (P20) and transmits it to the image processing apparatus 20 (P21).

The CPU 21 of the image processing apparatus 20 analyzes the received signal Result 2 (P22), and gives notice of the current status to the operation display section 27 (P23). The operation display section 27 having received this notice displays a screen indicating that the printer driver has changed from the pre-start state to the started-up state (P24).

Figure 20:
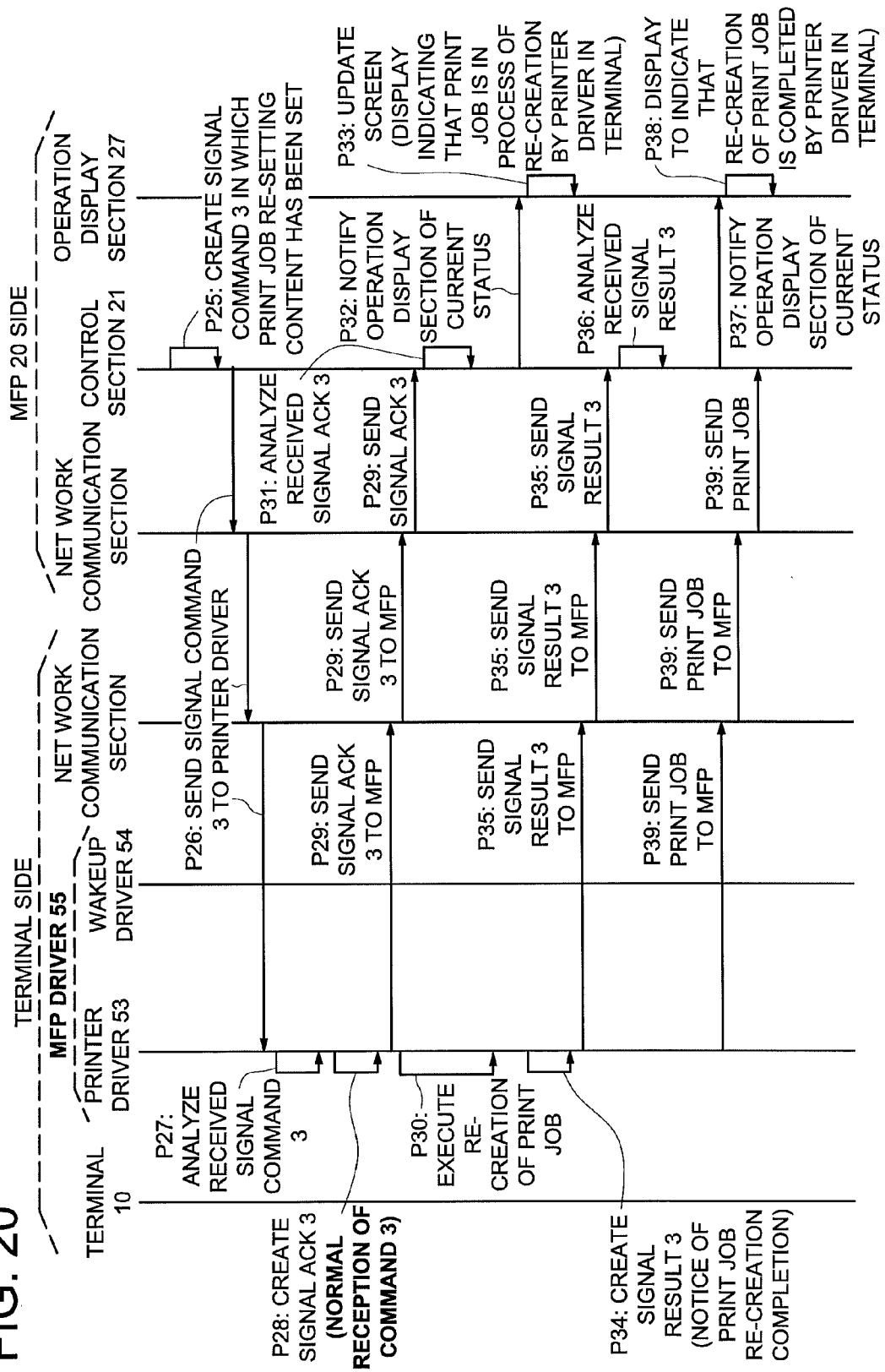
FIG. 20 is an explanatory diagram showing the operation sequence subsequent to FIG. 19.
Figure 21:
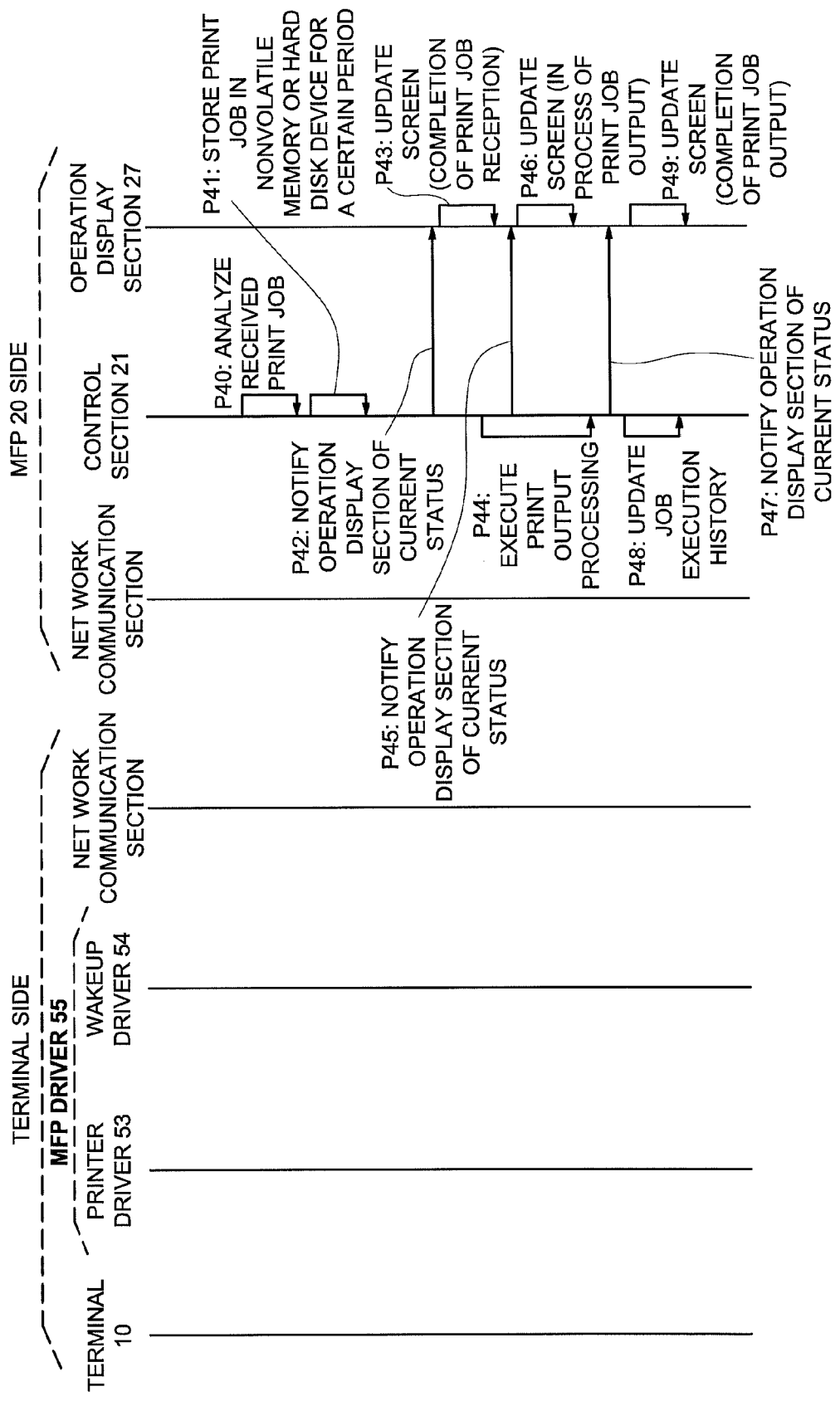
FIG. 21 is an explanatory diagram showing the operation sequence subsequent to FIG. 20.

Next, the CPU 21, generates a re-creation request as the signal Command 3 including the information identifying the print job that has been specified as the target for changes (the identification number that has been stored corresponding to that print job) and the information indicating the contents of those changes (FIG. 20: P25), and transmits this to the printer driver 53 of the terminal apparatus 10 (P26).

After this, the operations shown in P27 to P49 are the operations corresponding to P18 to P40 of the operation sequence 3, and their descriptions will be omitted here.

Figure 22:
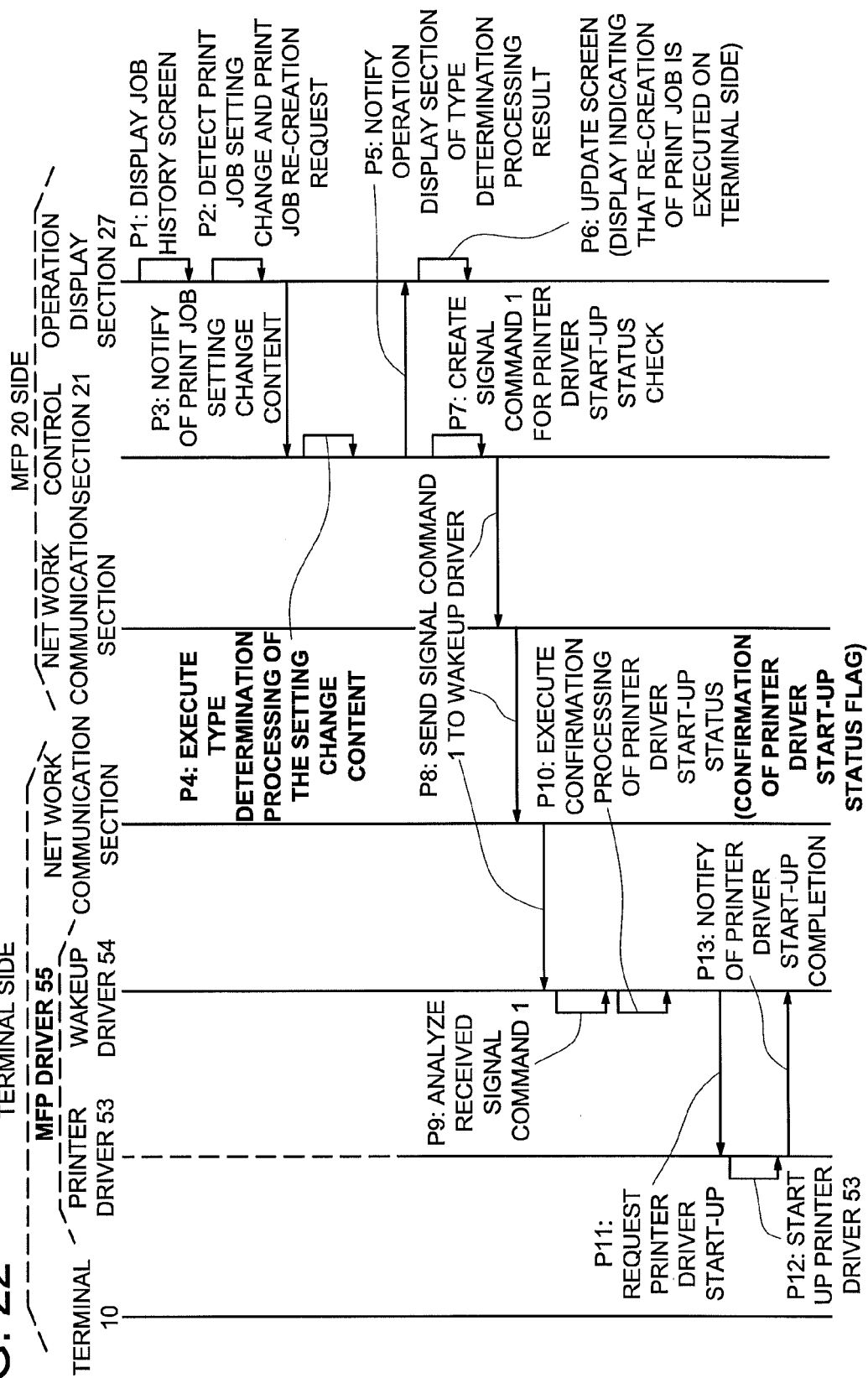
FIG. 22 is an explanatory diagram for the case of making the printer driver in the terminal apparatus carry out the print job re-creation processing and shows the operation sequence (the operation sequence 5) of a second example when the printer driver has not been started up.
Figure 23:
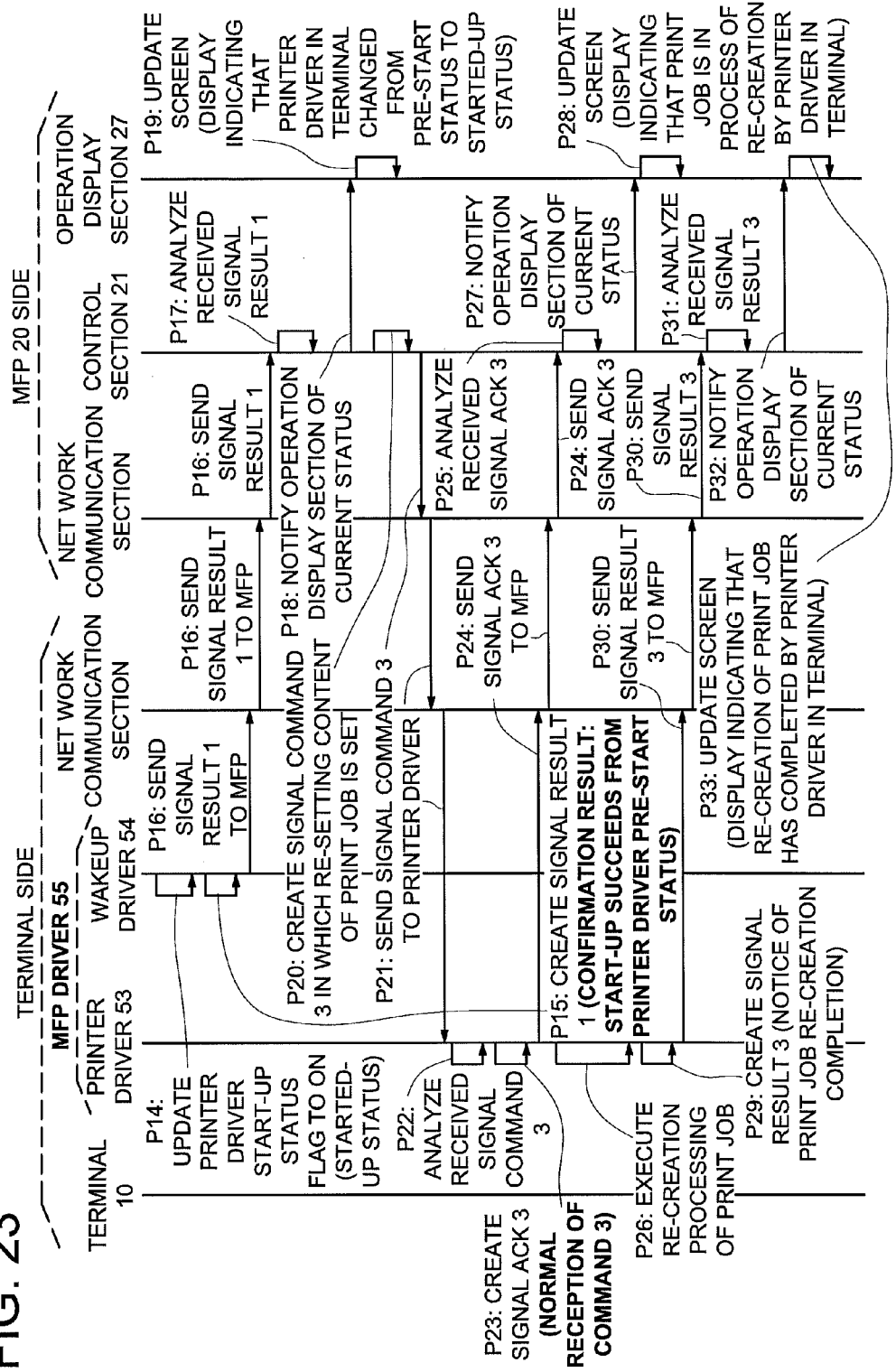
FIG. 23 is an explanatory diagram showing the operation sequence subsequent to FIG. 22.
Figure 24:
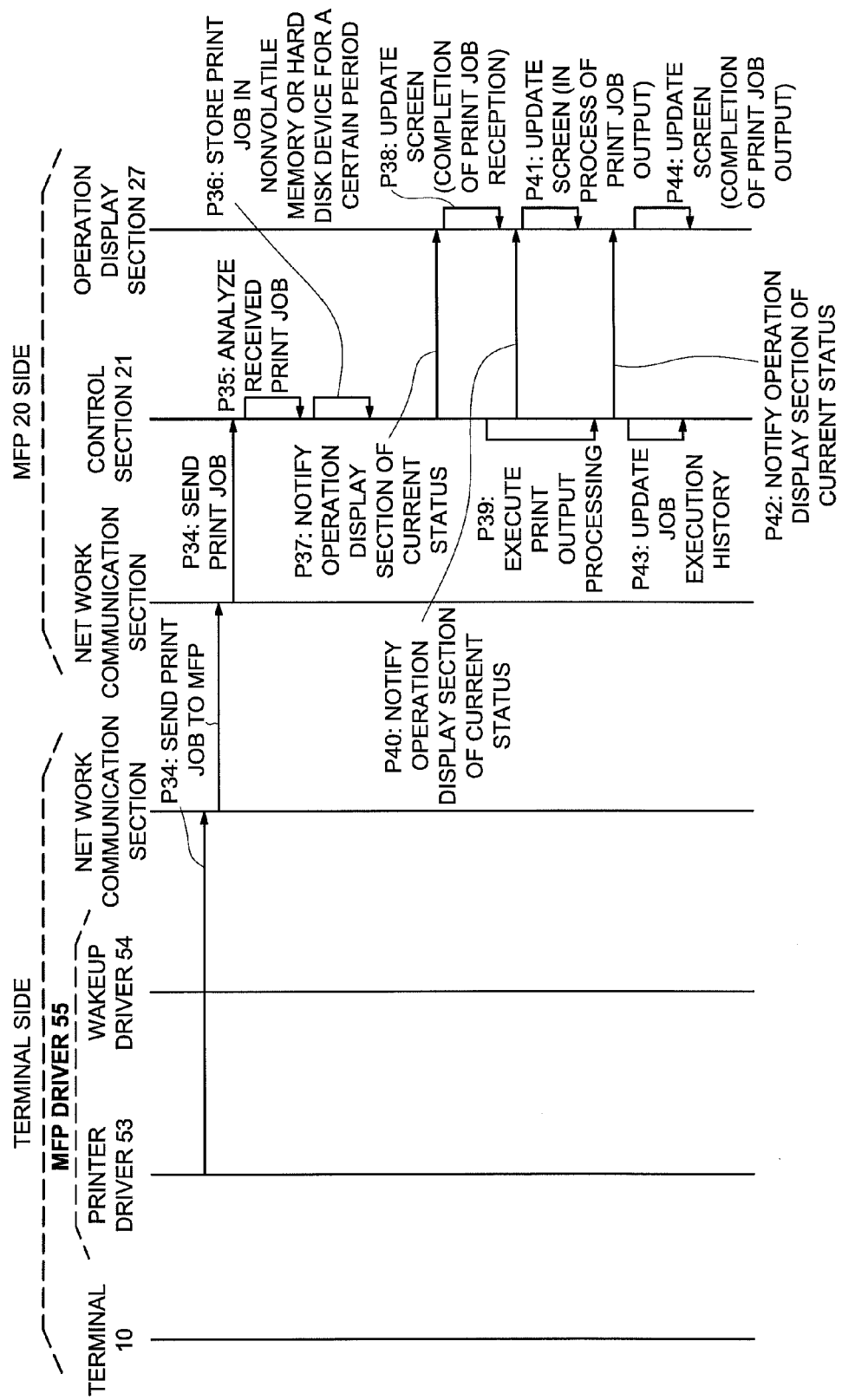
FIG. 24 is an explanatory diagram showing the operation sequence subsequent to FIG. 23.

⟨Operation Sequence 5⟩ The second example of when requesting the terminal apparatus 10 to carry out the print job re-creation processing and when the printer driver 53 of that terminal apparatus 10 has not been started:

FIGS. 22, 23, and 24 show the above operation sequence 5. The basic operations are the same as in the operation sequence 4. The point of difference is that, when the printer driver start-up state confirmation request (signal Command 1, FIG. 22: P8) is received, if it is confirmed that the printer driver has not started (P 10), at that point in time the wakeup driver 54 starts the printer driver 53 (P11, P12).

The printer driver 53 that has started gives the starting completion notice to the wakeup driver 54 (P13), and the wakeup driver 54 having received this notice not only updates the printer driver start-up status flag to ON (started-up state) (FIG. 23: P14), but also creates the signal Result 1 indicating that the starting of the printer driver has been successful (P15), and transmits this to the image processing apparatus 20 (P16).

The operations after receiving the signal Result 1 (FIG. 23: P17 to FIG. 24: P44) are identical to the operations in the operation sequence 4 after receiving the signal Result 2 (FIG. 19: P22 to FIG. 21: P49), and their explanations are omitted here.

Figure 25:
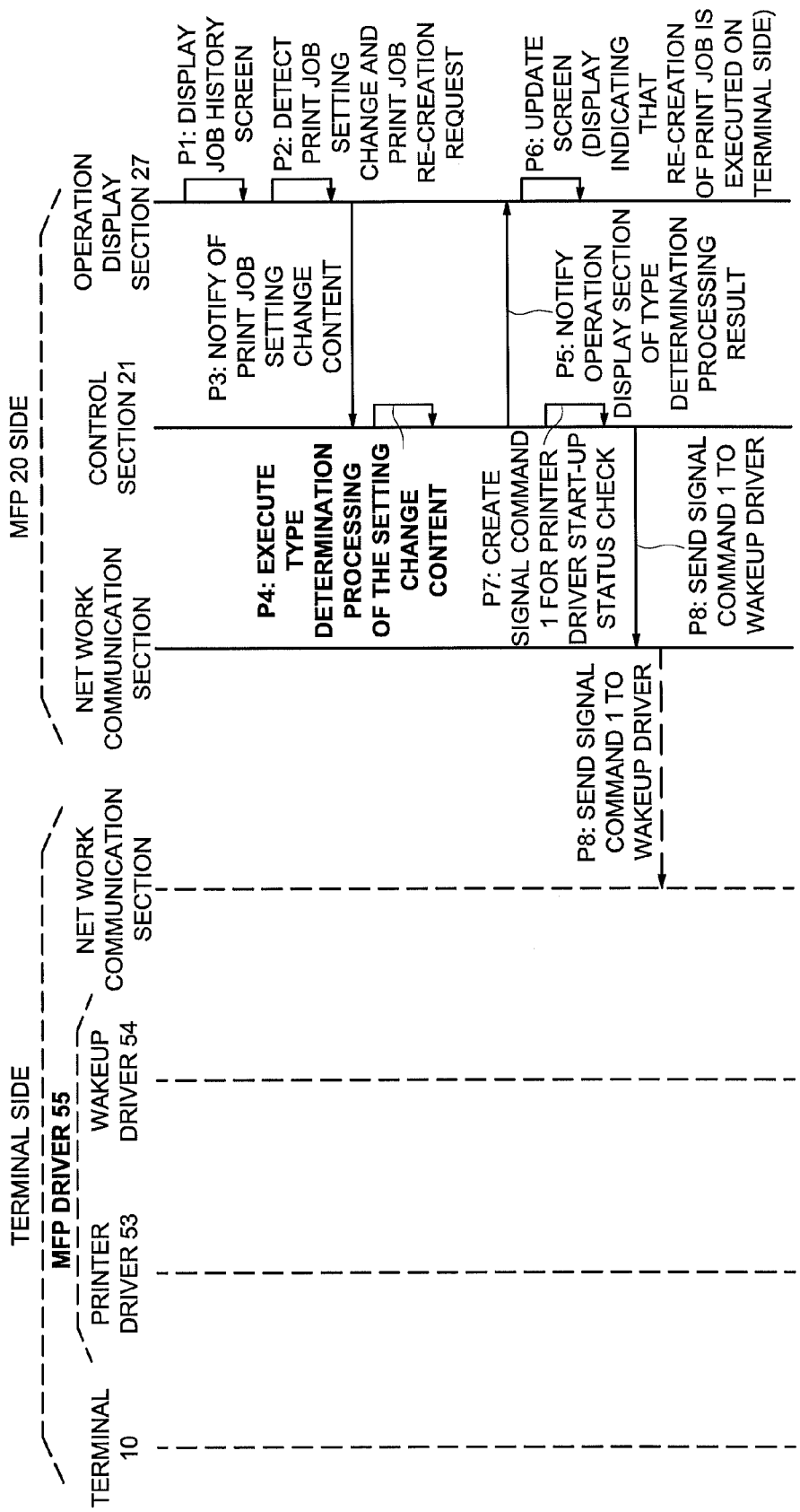
FIG. 25 is an explanatory diagram for the case when it is desired to make the printer driver in the terminal apparatus carry out the print job re-creation processing but communication is not possible or the like, and shows the operation sequence (the operation sequence 6) for the case of carrying out in the image processing apparatus the job re-creation processing while limiting only to the change elements that is possible in the image processing apparatus.
Figure 26:
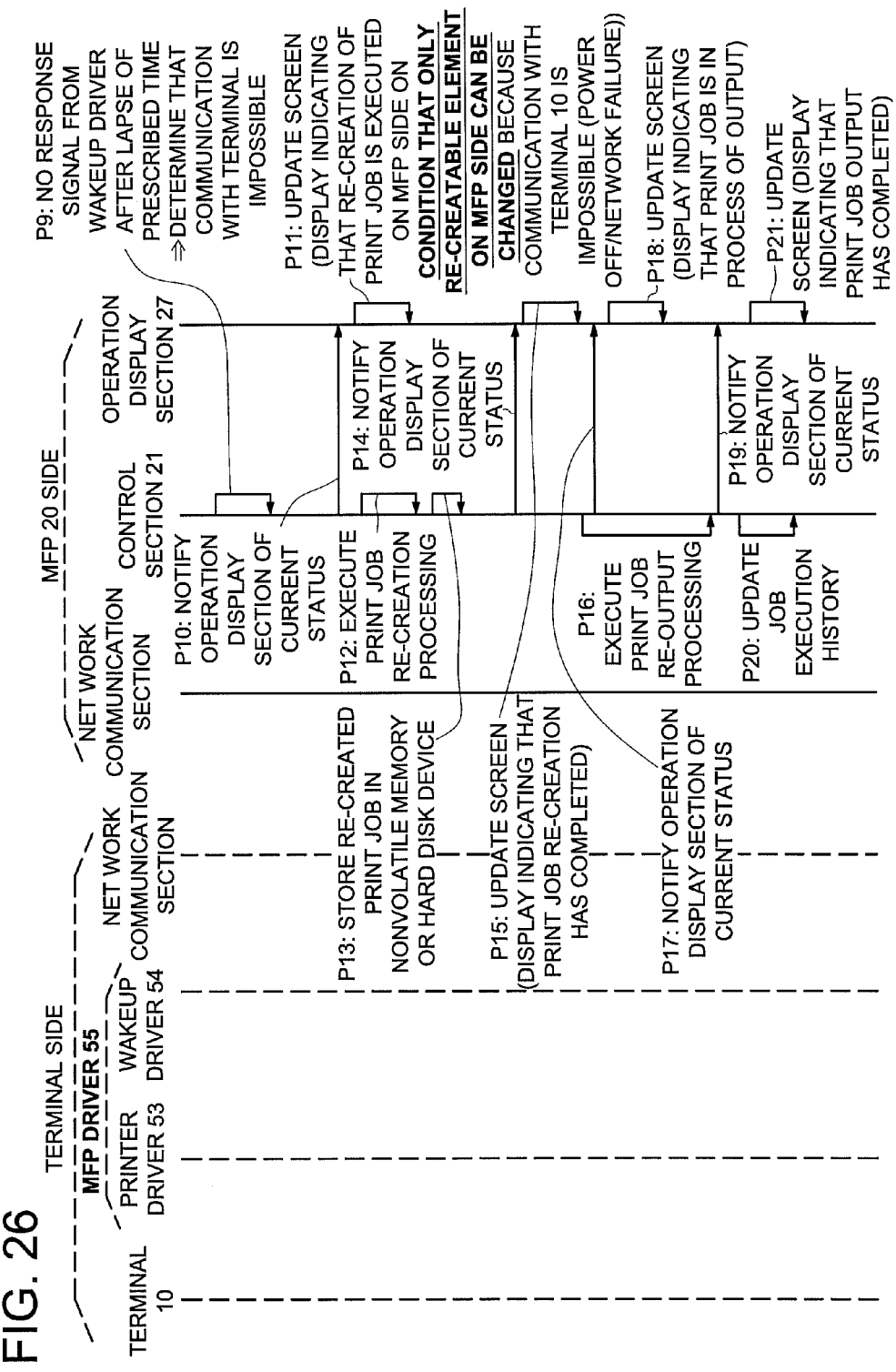
FIG. 26 is an explanatory diagram showing the operation sequence subsequent to FIG. 25.

⟨Operation Sequence 6⟩ When wanting to request the terminal apparatus 10 to carry out the print job re-creation processing, but due to communication being not possible with the terminal apparatus 10, the print job re-creation processing is carried out in the image processing apparatus 20 under the restriction that only the change elements that can be handled in the image processing apparatus 20 are processed:

FIG. 25 and FIG. 26 show the above operation sequence 6. Although the operations P1 to P8 carried out in the image processing apparatus 20 are similar to the operations of the operation sequence 3 shown in FIG. 14, since the communication is not possible with the terminal apparatus 10 and the Result signal in response to the signal Command 1 transmitted to the terminal apparatus 10 does not come back within a prescribed period of time, the CPU 21 of the image processing apparatus 20 judges that communication with the terminal apparatus 10 is not possible (FIG. 26: P9).

Because communication with the terminal apparatus 10 is not possible, the CPU 21 informs the operation display section 27 about the status indicating that the print job re-creation processing will be done in the image processing apparatus 20 only for the change elements that can be handled in the image processing apparatus 20 (FIG. 26: P10), and the operation display section 27 makes a display corresponding to this status (P11).

Next, the CPU 21, executes print job re-creation processing taking, as the change target, only the change elements that can be handled in the image processing apparatus 20 among the change instruction received from the user (P12), and stores the re-created print job in the nonvolatile memory 25 or in the hard disk device 26 (P13). Here, only the change elements for which the processing location is MFP in the control table 70 of change elements of FIG. 7 are taken as the targets of changing, and changes are not made for the change elements for which the processing location is "Terminal".

The operations after informing to the operation display section 27 about the status indicating that the execution of the print job re-creation processing has been completed (P14) are similar to the operations after P9 of FIG. 13, and their descriptions are omitted here.

Figure 28:
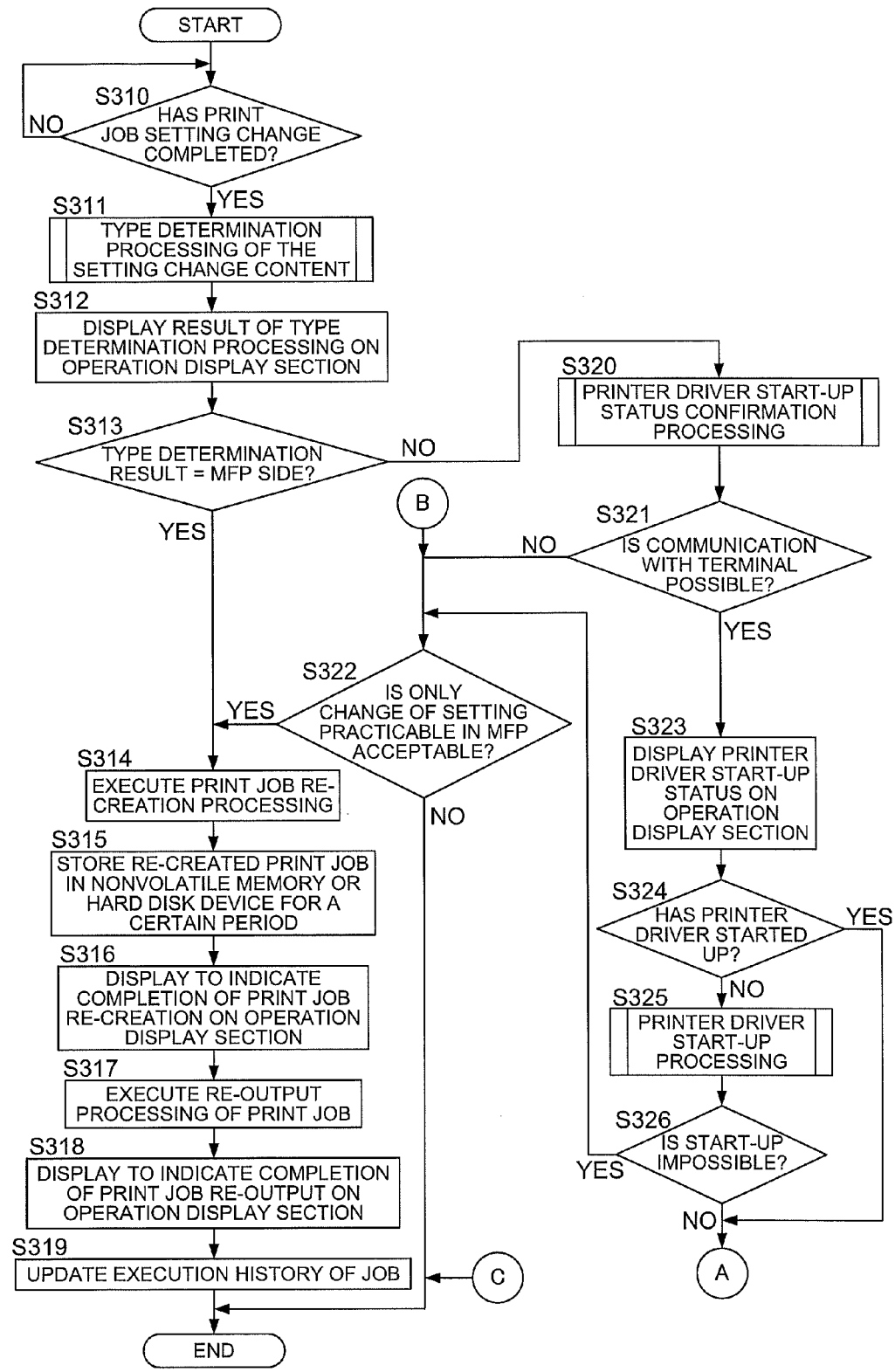
FIG. 28 is a flow chart showing the processing executed by the CPU of an image processing apparatus according to a first preferred embodiment when a screen is displayed of receiving change operations of the contents of settings of a print job.
Figure 29:
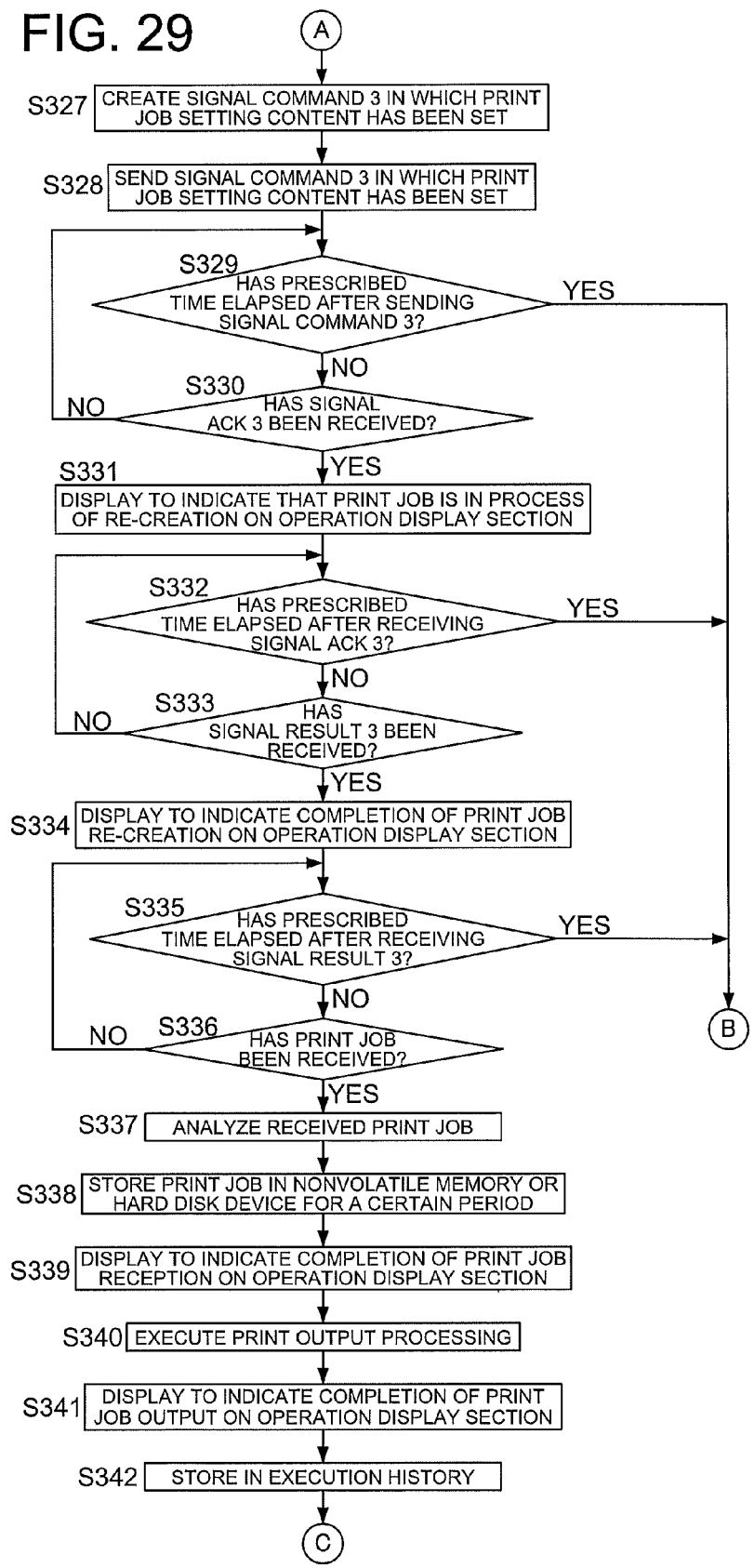
FIG. 29 is a flow chart showing the continuation of FIG. 28.

FIG. 28 and FIG. 29 show the flow of processing executed by the CPU 21 of the image processing apparatus 20 taking the displaying of the operation screen for changing the contents of settings of a print job as the starting condition (for example, the setting changing screen 65 of FIG. 6).

When the operation of end of changing the contents of settings for a print job is received (FIG. 28: YES in Step S310), type determination processing is carried out for selecting the execution location of the print job re-creation processing corresponding to that change instruction (Step S311), and the result is displayed in the operation display section 27 (Step S312).

Figure 30:
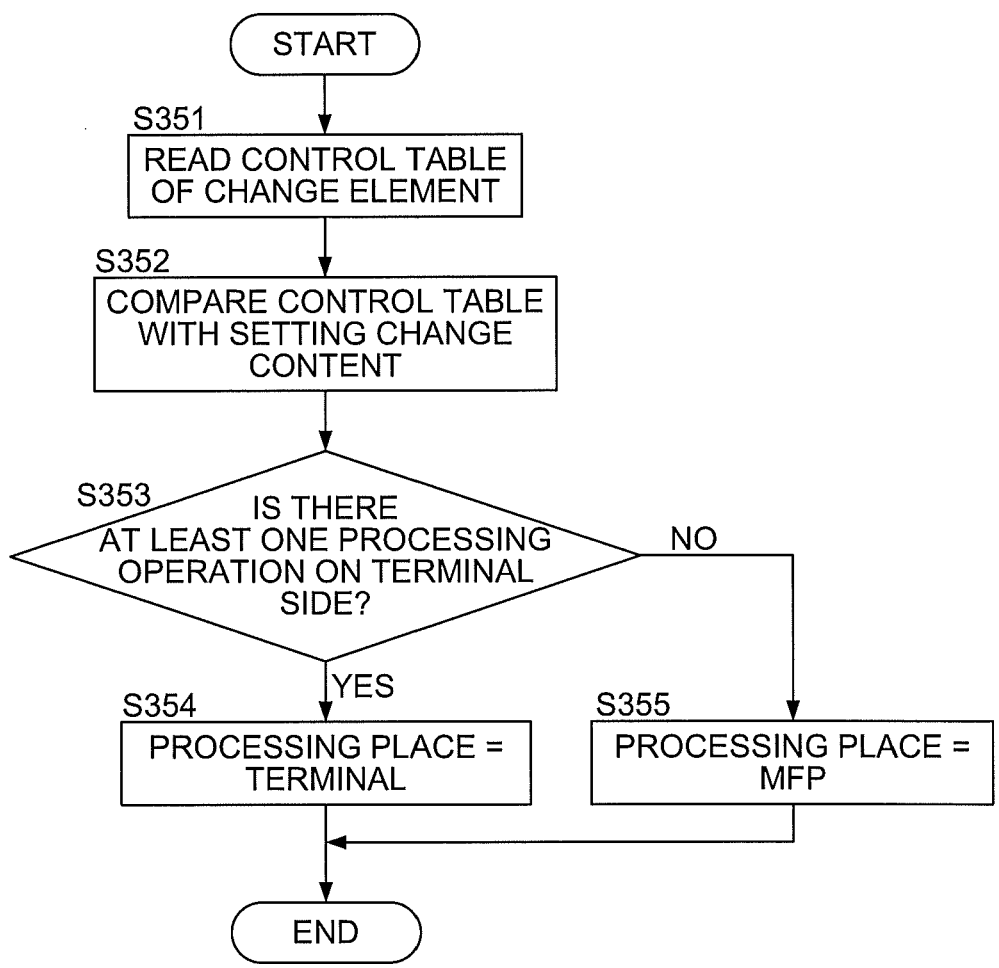
FIG. 30 is a flow chart showing the details of the type determination processing (Step S312).

FIG. 30 shows the details of the type determination processing (Step S311). The CPU 21 reads the change element control table 70 stored in the nonvolatile memory 25 or the like (Step S351). Next, the control table 70 and the contents of the change instruction (the specified settings change) are compared (Step S352), and if even one change element for which the processing location is "Terminal" is included in the change contents (YES in Step S353), the processing location is taken as "Terminal" (Step S354), and the processing is ended. If not even one change element for which the processing location is "Terminal" is included (NO in Step S353), the processing location is taken as "MFP" (Step S355), and the processing is ended.

The explanations are continued returning to FIG. 28. When the result of type determination in Step S312 is "MFP" (YES in Step S313), the print job re-creation processing is executed by the CPU 21 of that image processing apparatus 20 (Step S314), and the re-created print job is stored in the nonvolatile memory 25 or in the hard disk device 26 (Step S315). Next, when the print job re-creation processing is completed, that fact is displayed in the operation display section 27 (Step S316), and the output processing related to the print job created in that print job re-creation processing is executed (Step S317). When the output processing is completed, not only that fact is displayed in the operation display section 27 (Step S318), but also the execution history related to that print job is updated (Step S319), and the processing is ended.

When the result of type determination is not "MFP" (NO in Step S313), the printer driver start-up state confirmation processing is executed (Step S320).

Figure 31:
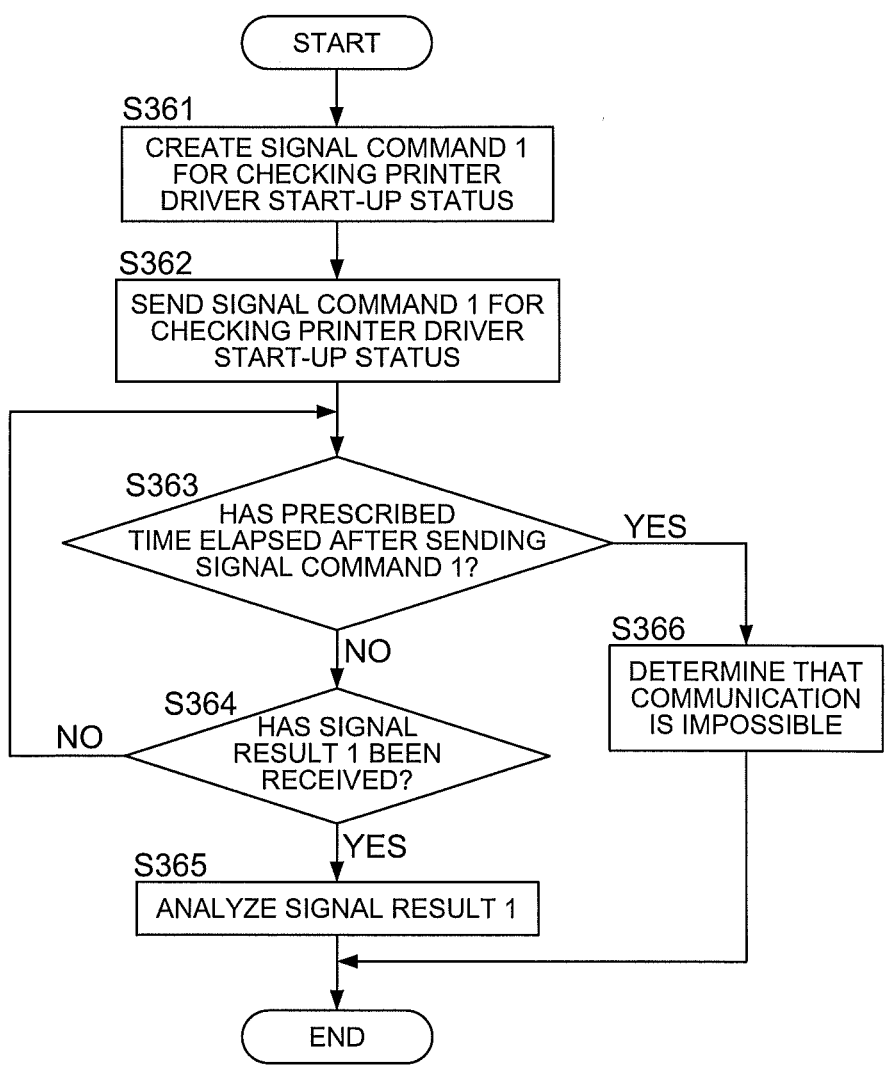
FIG. 31 is a flow chart showing the details of the printer driver start-up state confirmation processing.

FIG. 31 shows the details of the printer driver start-up state confirmation processing. The CPU 21 prepares the signal Command 1 for checking the start-up state of the printer driver (Step S361), and transmits it to the terminal apparatus 10 (Step S362). After transmitting, it monitors the reception of the signal Result 1 from the terminal apparatus 10, and before a prescribed time period has elapsed after transmitting the signal Command 1 (NO in Step S363), if the signal Result 1 is received (YES in Step S364), it analyzes that received signal Result 1 (Step S365), and ends the processing.

Without being able to receive the signal Result 1 (NO in Step S364), if a prescribed period of time has passed after transmitting the signal Command 1 (YES in Step S363), it is judged that communication is not possible (Step S366), and the processing is ended.

The explanations are continued returning to FIG. 28. If the result of the printer driver start-up state confirmation processing is "Communication impossible" (NO in Step S321), a prescribed screen is displayed in the operation display section 27 inquiring of the user as to whether or not it is acceptable to restrict the contents of settings changes corresponding to the change elements that can be handled by the image processing apparatus 20 (Step S322), and if a response allowing this restriction is received from the user (YES in Step S322), the print job re-creation processing is done by the CPU 21 of the image processing apparatus 20 taking, as the target of changes, only for the change elements that can be handled in the image processing apparatus 20 among the contents of changes received from the user (Step S314). Thereafter, the operations from Steps 315 to 5319 described above are executed, and the processing is ended.

If a response not allowing this restriction is received from the user (NO in Step S322), the processing is ended without carrying out printing.

If the result of the printer driver start-up state confirmation processing is not "Communication impossible" (YES in Step S321), the printer driver start-up state is displayed in the operation display section 27 (Step S323). If that start-up state is "Started-up" (YES in Step S324), the operation moves to Step S327 of FIG. 29, and if it is not "Started-up" (NO in Step S324), the printer driver starting processing is made (Step S325).

Figure 32:
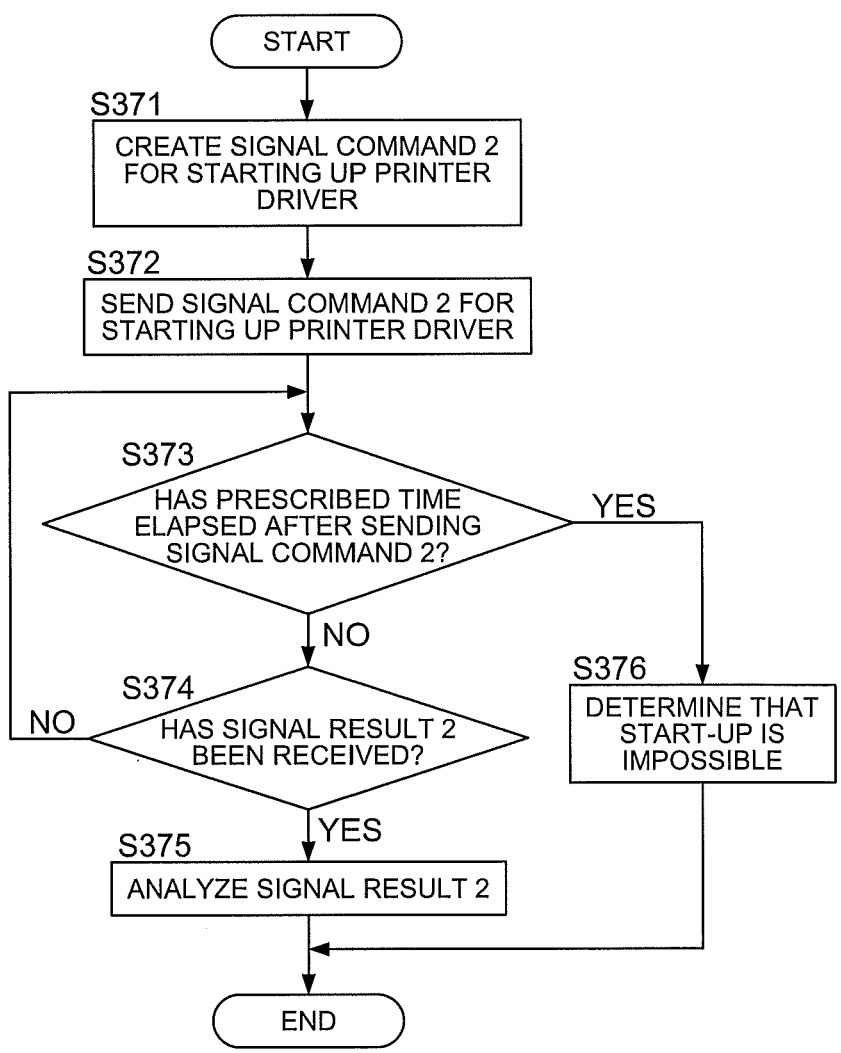
FIG. 32 is a flow chart showing the details of the printer driver start-up processing.

FIG. 32 shows the details of the printer driver starting processing. The CPU 21 prepares the signal Command 2 for starting the printer driver 53 of the terminal apparatus 10 (Step S371) and transmits it to the terminal apparatus 10 (Step S372). After transmitting, it monitors the reception of the signal Result 2 from the terminal apparatus 10, and before a prescribed period of time has elapsed (NO in Step S373) after transmitting the signal Command 2, if the signal Result 2 is received (YES in Step S374), it analyzes that received signal Result 2 (Step S375), and ends the processing.

Without being able to receive the signal Result 2 (NO in Step S374), if a prescribed period of time has passed after transmitting the signal Command 2 (YES in Step S373), it is judged that communication is not possible (Step S376), and the processing is ended.

The explanations are continued returning to FIG. 28. If the result of the printer driver start-up state confirmation processing is "Start-up impossible" (YES in Step S326), the operation moves to Step S322. If the result is not "Start-up impossible" (NO in Step S326), the operation moves to Step S327 of FIG. 29.

In Step S327, the signal Command 3 is prepared including the information indicating the contents of changes, and this is transmitted to the terminal apparatus 10 (Step S328). After transmitting, the CPU 21 monitors the reception of the signal Ack 3 indicating the normal reception of the signal Command 3, if without receiving the signal Ack 3 (NO in Step S330) a prescribed period of time has elapsed after transmitting the signal Command 3 (YES in Step S329), the processing moves to Step S322 of FIG. 28. Before a prescribed period of time has elapsed (NO in Step S329) after transmitting the signal Command 3, if the signal Ack 3 is received (YES in Step S330), the fact that the print job re-creation processing is under execution is displayed in the operation display section 27 (Step S331).

After that, the CPU 21 monitors the reception of the signal Result 3 from the terminal apparatus 10, without receiving the signal Result 3 (NO in Step S333) if a prescribed period of time has elapsed after the reception of the signal Ack 3 (YES in Step S332), the processing moves to Step S322 of FIG. 28. If the signal Result 3 is received (YES in Step S333) before a prescribed period of time has elapsed after the reception of the signal Ack 3 (NO in Step S332), the completion of the print job re-creation processing is displayed in the operation display section 27 (Step S334).

After that, the CPU 21 monitors the reception of the re-created print job (updated print job) from the terminal apparatus 10, and without receiving that print job (NO in Step S336), if a prescribed time duration has elapsed after the reception of the signal Result 3 (YES in Step S335), the processing moves to Step S322 of FIG. 28. If the print job is received (YES in Step S336) before a prescribed period of time has elapsed after the reception of the signal Result 3 (NO in Step S335), the received print job is analyzed (Step S337), and next this print job is stored either in the nonvolatile memory 25 or in the hard disk device 26 (Step S338). The duration of this storing is as has been explained in P32 of the operation sequence 3.

Next, the CPU 21 displays the fact that the reception of the re-created print job (updated print job) is completed in the operation display section 27 (Step S339), executes the output processing related to that print job (Step S340), and when the outputting is completed, not only displays that fact in the operation display section 27 (Step S341), but also stores the execution history of that print job (Step S342), and ends the processing.

In this manner, in an image processing apparatus 20 according to the first preferred embodiment, a print job is stored even after printing, operations of changing the contents of settings are received for that print job from the operation display section 27 of the image processing apparatus 20. When even one change element that involves change of the image related data is present in the contents of those changes, the creation of a print job for that change is made to be carried out on the side of the terminal apparatus 10. When not even one change element that involves change of the image related data is present in the contents of those changes, the creation of a print job for that change is made by the apparatus itself (the image processing apparatus 20). Because of this, it is possible to create a print job corresponding to the change contents at a suitable location according to the change contents.

In other words, since change elements that involve changing the image related data cannot be handled in the image processing apparatus 20, by making the printer driver 53 of the terminal apparatus 10 execute the processing, even when the change involves changing the image related data, it is possible to handle such changes by receiving them by the image processing apparatus 20. On the other hand, when changes of image related data are not involved (when the changes are only of the output setting parameters), by carrying it out in the image processing apparatus 20, it is not necessary to transmit the data of the print job after updating from the terminal apparatus 10 to the image processing apparatus 20, and the communication load is reduced. Further, when no changes of image related data are made, since the amount of processing in the print job re-creation processing is small, when that processing is carried out in the image processing apparatus 20, there is no obstruction caused to the execution of other processing.

Further, when communication is not possible with the terminal apparatus 10 or when the printer driver 53 of the terminal apparatus 10 cannot be started, since the print job re-creation processing is carried out in the image processing section limiting only to the change elements that can be handled by the image processing apparatus 20, even when it is not possible to request the terminal apparatus 10 to carry out the print job re-creation processing, it is possible to handle the changes received through the operation display section 27 of the image processing apparatus 20 within a limited range. In addition, when limited as mentioned above, since the user is asked whether or not to carry out that printing, when the user does not desire printing in the limited change conditions, it is possible to suspend printing and to suppress wasteful printing. Further, when it is not possible to carry out printing by changing the contents of settings as specified by the user, it is can be configured so that the printing is suspended forcibly without asking the user.

Next, a second preferred embodiment of the present invention is described below.

While the configuration in the first preferred embodiment is one in which it is not possible for the image processing apparatus 20 to execute print job re-creation processing involving change of image related data, in the second preferred embodiment, the print job re-creation processing related to all change elements can be executed in the image processing apparatus 20. In addition, while in the first preferred embodiment, whether to make the printer driver 53 of the terminal apparatus 10 or the image processing apparatus 20 the execution location of print job re-creation processing is judged based on the criterion of whether or not image related data is present in the change elements, in the second preferred embodiment, the execution location of processing is judged based on the processing capacity of the image processing apparatus 20, or on that processing capacity and the contents of changes.

The image processing apparatus 20 according to the second preferred embodiment is similar to the first preferred embodiment except for the above points of difference, and their descriptions are omitted. In the following, the points of difference with the first preferred embodiment are mainly described.

According to the purpose of reducing the communication volume between the terminal apparatus 10 and the image processing apparatus 20, it is desirable that the print job re-creation processing is carried out in the image processing apparatus 20 as much as possible. However, since the processing is complex when changes of image related data are involved, depending on the processing capacity (resource) of the image processing apparatus 20, that is, when the CPU capacity is low or when the usable memory is small, a long processing time is required until the completion of the print job re-creation processing, thereby making the user wait, or it becomes impossible to carry out real time processing of the image processing apparatus 20 so that it will not be possible to carry out processing of other jobs, or it will become impossible to carry out real time processing of tasks. Because of this, even when the image processing apparatus 20 has the function of executing the print job re-creation involving change of image related data, it may be desirable to make the printer driver 53 carry out the print job re-creation processing. Therefore, in the second preferred embodiment, based on the processing capacity (CPU capacity or memory capacity or the like) of the image processing apparatus 20, a judgment is made as to whether to make that image processing apparatus 20 or to make the printer driver 53 the execution location of print job re-creation processing.

Further, the processing capacity (resource) of the image processing apparatus 20 changes, for example, when customization is done such as adding memory. Also, when carrying out setting changes while another job is under execution (facsimile reception, or the like), since the resources are consumed by the processing related to other jobs, depending on the status of their execution, the resources that can be used for the print job re-creation processing varies. In view of this, in the second preferred embodiment, as is shown in FIG. 33 and FIG. 34, a plurality of control tables 70A to 70E are prepared indicating the location of processing execution for each change element, and the control table that is referred to at the time of judging the execution location of the print job re-creation processing is switched according to the processing capacity of the image processing apparatus 20.

There is a first method of determining the above processing capacity based on the specifications of the hardware resources of the part of the image processing apparatus 20 that is related to the print job re-creation processing, and a second method of determining according to the unused processing capacity among the above hardware resources (the processing capacity that can be used by the print job re-creation processing). Both the first method and the second method can be used at the same time. Further, here, the hardware resources of the part that is related to the print job re-creation processing are taken as the CPU 21 and the memory (RAM 24).

⟨The First Method⟩

In the first method, coefficients are assigned to the CPU and the memory according to their performance capacity (operating speed) or storage capacity, and the rank of the processing capacity is determined by the product of the coefficient assigned to the CPU (the CPU coefficient) and the coefficient assigned to the memory (the memory coefficient) (α=CPU coefficient×memory coefficient).

FIG. 35a is a table showing a list of the CPU coefficients. A larger value CPU coefficient is assigned as the operating frequency of the CPU becomes higher. FIG. 35b is a table showing a list of the memory coefficients. A larger value memory coefficient is assigned as the storage capacity of the memory becomes larger. FIG. 35c is a table showing a list of the correspondence between the value of the coefficient α (α=CPU coefficient×memory coefficient) and the rank. Based on FIGS. 35a to 35c, the rank of the processing capacity is determined corresponding to the combination of the CPU performance capacity (operating frequency) and the memory storage capacity. FIG. 35d is a table listing the rank according the combinations of the CPU performance capacity (operating frequency) and the memory storage capacity determined in this manner.

The control table 70A of FIG. 33 is a control table that is referred to in the case of Rank A, and since the processing capacity of the image processing apparatus 20 is high in the case of Rank A, the location of processing is taken as the MFP (the image processing apparatus 20) for all change elements including those involving changing the image related data.

The control table 70B of FIG. 33 is a control table that is referred to in the case of Rank B. The location of processing is taken as the "Terminal" for a part of the change elements involving changing the image related data. The control table 70C of FIG. 33 is a control table that is referred to in the case of Rank C. The location of processing for all change elements involving changing the image related data is taken as "Terminal". The control table 70D of FIG. 34 is a control table that is referred to in the case of Rank D. The location of processing for all change elements involving changing the image related data and a part of the change elements involving changing the output setting parameters is taken as "Terminal". The control table 70E of FIG. 34 is a control table that is referred to in the case of Rank E. Since Rank E is the case when the processing capacity of the image processing apparatus 20 is the lowest, the location of processing for all change elements is taken as "Terminal".

⟨The Second Method⟩

In the second method, coefficients are assigned to the CPU and the memory according to their rates of usage, and the rank of the processing capacity is determined by the product of the coefficient assigned to the CPU (the CPU coefficient) and the coefficient assigned to the memory (the memory coefficient) (α=CPU coefficient×memory coefficient).

Here, an example is described for the case when the operating frequency of the CPU is 2.0 GHz and the memory storage capacity is 2.0 GB as the specifications of the hardware resources.

FIG. 36a is a table showing a list of the CPU coefficients. A larger value CPU coefficient is assigned as the usage rate of the CPU by other jobs or others becomes lower. FIG. 36b is a table showing a list of the memory coefficients. A larger value memory coefficient is assigned as the usage rate of the memory by other jobs or others becomes lower. FIG. 36c is a table showing a list of the correspondence between the value of the coefficient α (α=CPU coefficient×memory coefficient) and the rank. Based on FIGS. 36a to 36c, the rank of the processing capacity is determined corresponding to the combination of the CPU usage rate and the memory usage rate. FIG. 36d is a table listing the rank according the combinations of the CPU usage rate and the memory usage rate determined in this manner.

The control table 72A of FIG. 37 is a control table that is referred to in the case of Rank A, and since the resource usage rate is low (the resource amount that can be used by the print job re-creation processing is large) in the case of Rank A, the location of processing is taken as the MFP (the image processing apparatus 20) for all change elements including those involving changing the image related data.

The control table 72B of FIG. 37 is a control table that is referred to in the case of Rank B. The location of processing is taken as the "Terminal" for all change elements involving changing the image related data. The control table 72C of FIG. 37 is a control table that is referred to in the case of Rank C. The location of processing for all change elements involving changing the image related data and a part of the change element involving changing the output setting parameters is taken as "Terminal". The control table 72D of FIG. 38 is a control table that is referred to in the case of Rank D. The control table 72E of FIG. 38 is a control table that is referred to in the case of Rank E. Since Rank E is the case where the resource usage rate is the highest (the resource amount that can be used by the print job re-creation processing is small), the location of processing for all change elements is taken as "Terminal".

Figure 39:
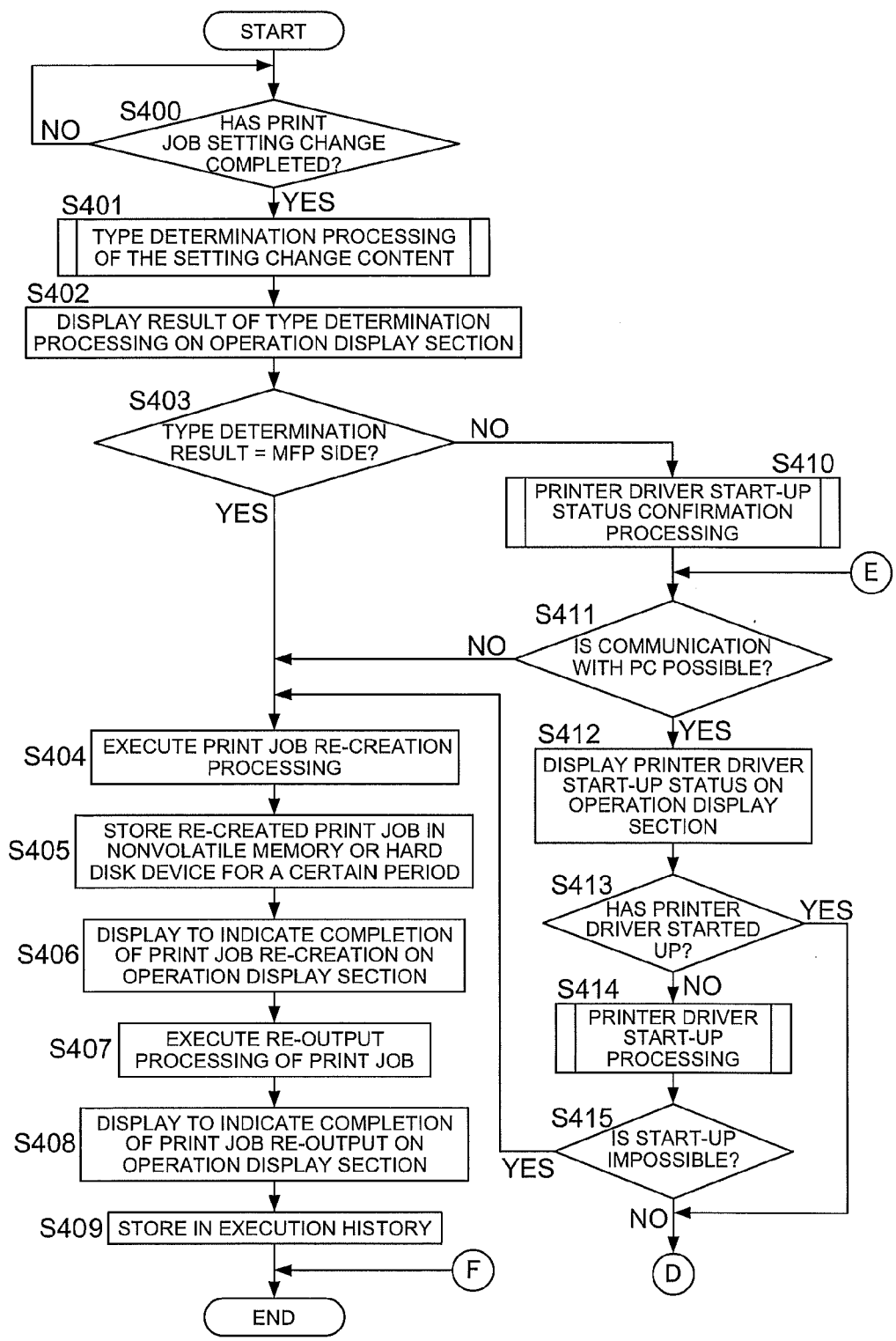
FIG. 39 is a flow chart showing the processing executed by the CPU of an image processing apparatus according to a second preferred embodiment when a screen is displayed of receiving change operations of the contents of settings of a print job.
Figure 40:
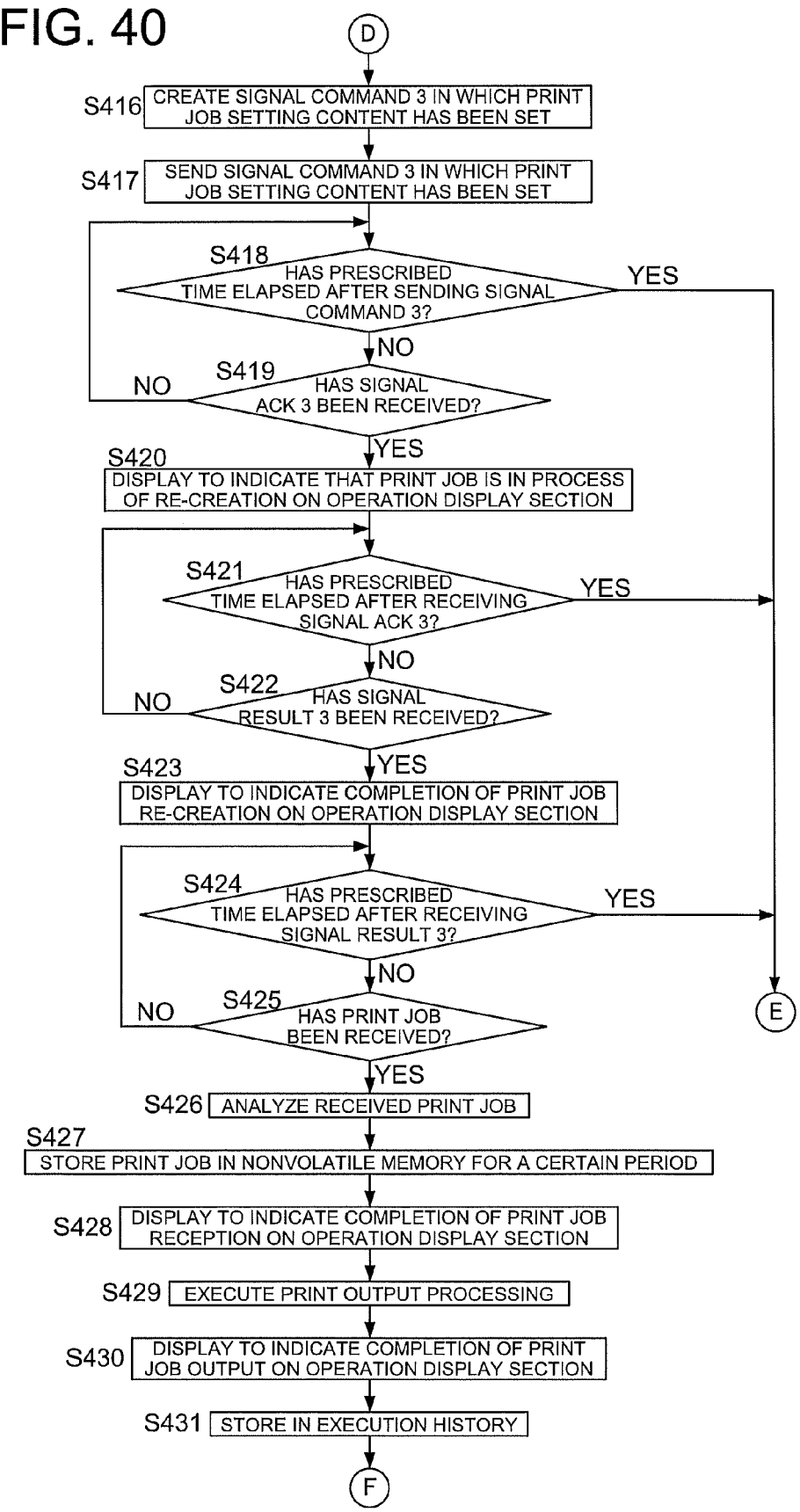
FIG. 40 is a flow chart showing the continuation of FIG. 39.

FIG. 39 and FIG. 40 show the flow of processing executed by the CPU 21 of the image processing apparatus 20 according to the second preferred embodiment taking, as the starting condition, the displaying of the operation screen for changing the contents of settings of a print job (for example, the setting changing screen 65 of FIG. 6).

When the operation to end the changing of the contents of settings for a print job is received (FIG. 39: YES in Step S400), type determination processing is carried out for selecting the execution location of the print job re-creation processing corresponding to that change instruction (Step S401), and the result is displayed in the operation display section 27 (Step S402).

Figure 41:
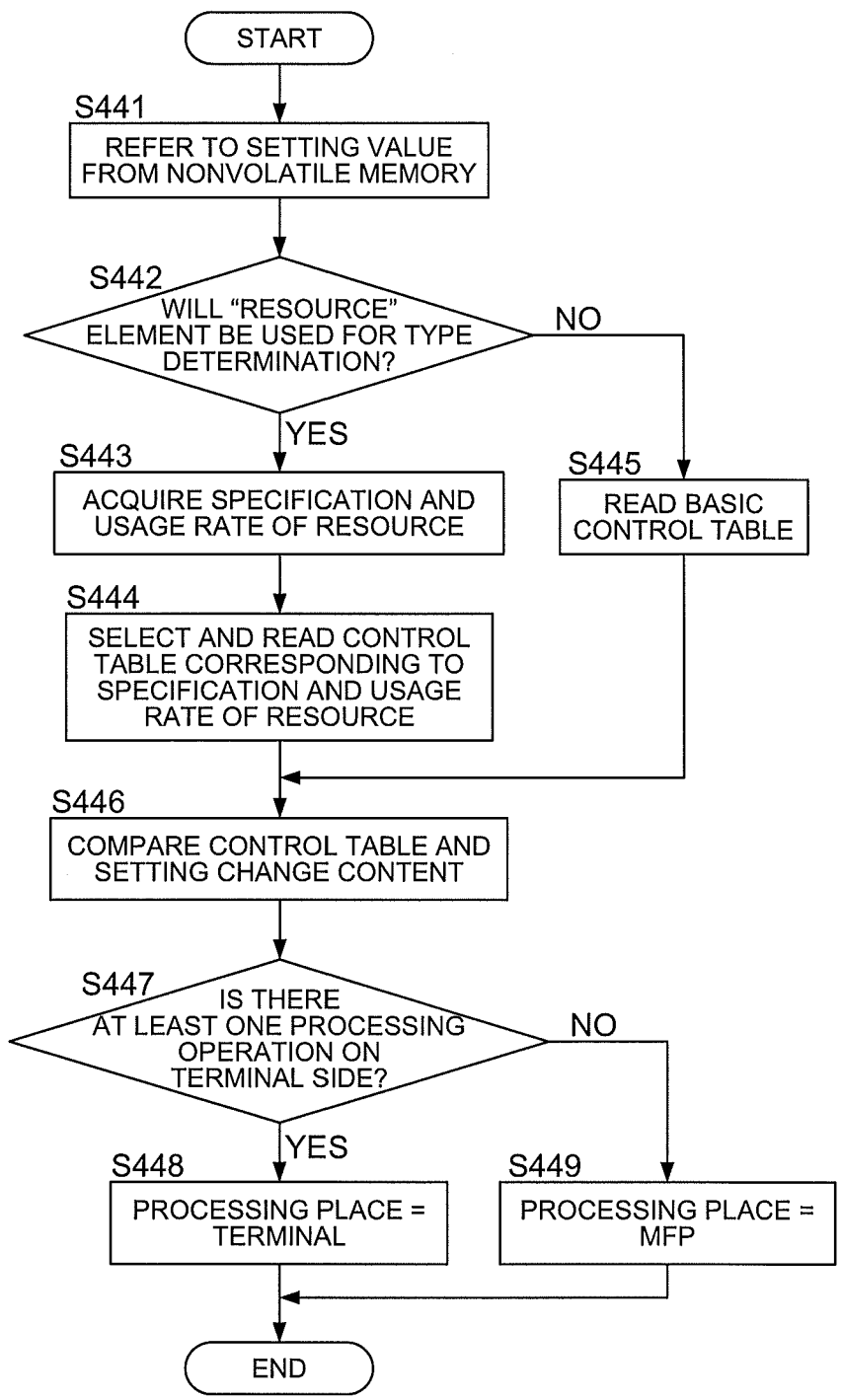
FIG. 41 is a flow chart showing the details of the type determination processing (Step S402).

FIG. 41 shows the details of the above type determination processing (Step S401). The CPU 21 refers to a prescribed set value stored in the nonvolatile memory 25 or the like (Step S441). This set value is a set value indicating whether or not to add the resources (the processing capacity of the image processing apparatus 20) to the elements for selecting the execution location of the processing, and is set in advance by the manager or the like.

When that set value is a value indicating "add resources to the elements" (YES in Step S442), the specifications of the resources of that image processing apparatus 20 and the usage rate of those resources are obtained (Step S443). The specifications of the resources are the CPU operating frequency, the memory capacity and the like, and for example, since the results of checking the hardware configuration during the initialization processing of that image processing apparatus 20 are stored in the nonvolatile memory 25, these are obtained by referring to this information. Further, the usage rate is obtained, for example, from a task that manages the execution of current jobs, or from a task that manages the memory usage condition.

Next, from the obtained resource specifications and their usage rates, the control table to be used for the current judgment is selected and read in (Step S444). Here, the group of control tables corresponding to the specification of the resources is determined from the CPU operating frequency and the memory capacity. For example, if the operating frequency of the CPU is 2.0 GHz and the memory storage capacity is 2.0 GB, the group of control tables corresponding to these specifications is selected (in the case of this example, the group of control tables given in FIG. 37 and FIG. 38). Next, the rank is determined based on the usage rate of resources, and eventually the control table corresponding to the rank of this usage rate is selected from the group of control tables having been selected.

On the other hand, when the set value is a value indicating "add resources to the elements" has not been made (NO in Step S442), the basic control table, for example, the control table 70 shown in FIG. 7 is read in (Step S445).

Next, the control table 70 read in Step S444 or in Step S445 and the contents of the setting changes are compared (Step S446), and if even one change element for which the processing location is "Terminal" is included in the contents of the setting change (YES in Step S447), the processing location is taken as "Terminal" (Step S448), and the processing is ended. If not even one change element for which the processing location is "Terminal" is included in the contents of the setting change (NO in Step S447), the processing location is taken as "MFP" (Step S449), and the processing is ended.

The explanations are continued returning to FIG. 39. When the result of type determination in Step S401 is "MFP" (YES in Step S403), the print job re-creation processing is executed by the CPU 21 of that image processing apparatus 20 (Step S404). After this, the Steps S405 to S409 are identical to the Steps S31S to S319 of FIG. 28, and their explanations are omitted here.

When the result of type determination is not "MFP" (NO in Step S403), the printer driver start-up state confirmation processing similar to that shown in FIG. 31 is executed (Step S410). When the result of the printer driver start-up state confirmation processing is "Communication impossible" (NO in Step S411), the operation moves to Step S404, the print job re-creation processing is executed in the image processing apparatus 20, and the printing is executed. If the result of the printer driver start-up state confirmation processing is not "Communication impossible" (YES in Step S411), the printer driver start-up state is displayed in the operation display section 27 (Step S412), if that start-up state is "Started-up" (YES in Step S413), the operation moves to Step S416 of FIG. 40, and if it is not "Started-up" (NO in Step S413), the printer driver starting processing is made similar to FIG. 32 (Step S414). If the result of the printer driver starting-up processing is "Star-up impossible" (YES in Step S415), the operation moves to Step S404, the print job re-creation processing is executed in the image processing apparatus 20, and the printing is executed. If the result is not "Start-up impossible" (NO in Step S415), the operation moves to Step S416 of FIG. 40.

Further, the operations in and after Step S416 are similar to the operations in and after Step S327 in FIG. 29, and their explanations are omitted.

The operation sequences of the operation sequence 1 to operation sequence 5 explained for the first preferred embodiment are similar even in the second preferred embodiment. Instead of the operation sequence 6 explained in the first preferred embodiment, the following operation sequence 7 is carried out in the second preferred embodiment.

Figure 27:
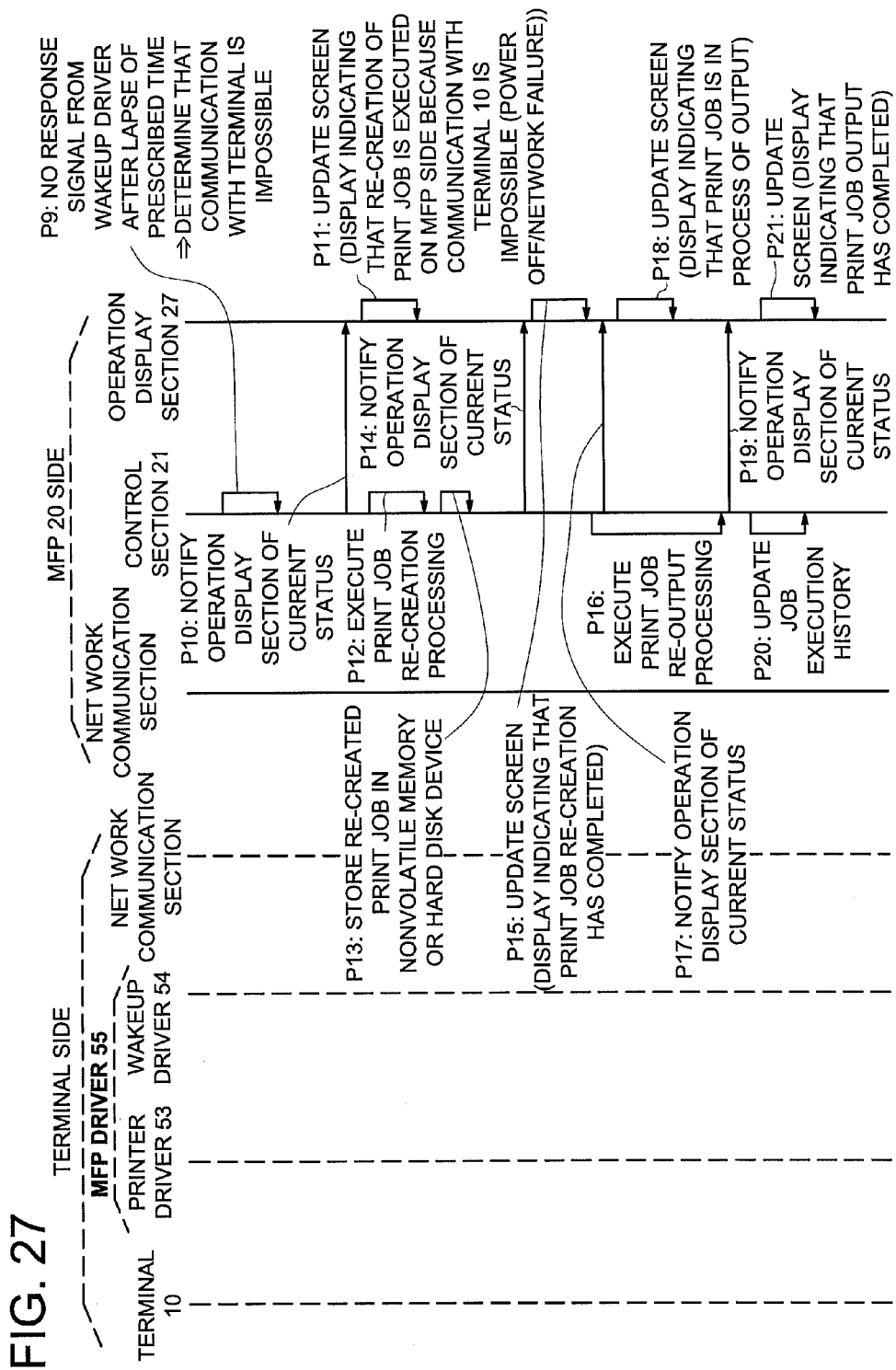
FIG. 27 is an explanatory diagram for the case when it is desired to make the printer driver in the terminal apparatus carry out the print job re-creation processing but communication is not possible or the like, and shows the operation sequence (the operation sequence 7) for the case of carrying out in the image processing apparatus the job re-creation processing for all the change elements.

⟨Operation Sequence 7⟩ When wanting to request the terminal apparatus 10 to carry out the print job re-creation processing, but due to communication not being possible with the terminal apparatus 10, the print job re-creation processing is carried out in the image processing apparatus 20 so that all the change elements may be handled in the image processing apparatus 20:

FIG. 25 and FIG. 27 show the above operation sequence 7. The operations P1 to P8 carried out in the image processing apparatus 20 are the same as the operations carried out in the operation sequence 6. When the CPU 21 judges that communication with the terminal apparatus 10 is not possible (FIG. 27: P9), it notifies the operation display section 27 about the status that the print job re-creation processing will be done in the image processing apparatus 20 (FIG. 27: P10), and the operation display section 27 makes a display indicating that the print job re-creation processing corresponding to all the change elements will be done in the image processing apparatus 20 (P11).

Next, the CPU 21, executes print job re-creation processing taking all the change elements in the instruction received from the user as the change target (P12), and stores the re-created print job in the nonvolatile memory 25 or in the hard disk device 26 (P13). The operations after notifying the operation display section 27 about the status indicating that the execution of the print job re-creation processing has been completed (P14) are similar to the operations after P9 of FIG. 13, and their explanations are omitted here.

In the above manner, in the second preferred embodiment, since whether to make that image processing apparatus 20 or the printer driver 53 in the terminal apparatus 10 the execution location of the print job re-creation processing is judged based on the processing capacity of the image processing apparatus 20, and since the execution of the print job re-creation processing is made in the image processing apparatus 20 if the processing capacity is high, it becomes unnecessary to transfer the updated print job from the terminal apparatus 10 to the image processing apparatus 20 which becomes necessary when the print job re-creation processing is carried out by the printer driver 53 of the terminal apparatus 10, and hence the communication load between the terminal apparatus 10 and the image processing apparatus 20 gets reduced.

On the other hand, when the processing capacity of the image processing apparatus 20 is low or is insufficient, since the print job re-creation processing is carried out by the printer driver 53 of the terminal apparatus 10, compared to the case of carrying out the print job re-creation processing in the image processing apparatus 20 with a low processing capacity, it is possible to make the waiting time short until obtaining the updated print job, and to avoid the situation in which the user is made to wait for a long time until the updating is completed. In addition, it is possible to avoid the problem, which is likely to occur when real time processing by the image processing apparatus 20 cannot be made, that other job processing or real time processing of task processing cannot be made.

In addition, in the second preferred embodiment, since the execution location of the print job re-creation processing is selected based on both the processing capacity of the image processing apparatus 20 and the contents of settings changes, it is possible to select a more appropriate execution location according to the contents of settings changes.

In the above, although some preferred embodiments of the present invention are described with reference to drawings, the concrete configuration shall not be limited to those shown in the preferred embodiments, and any modifications or additions within a range not deviating from the scope and intent of the present invention shall be construed to be included in the present invention.

If the configuration is made so that changes for a print job are received only for a prescribed period after completing its first printing, for example, if the printer driver 53 is made to be present in the started-up state until a prescribed period of time has elapsed after the printing is completed of the print job, it is also possible to have a configuration in which the wakeup driver 54 is not provided.

Further, concerning the information identifying a print job such as the identification numbers, for example, it is also possible to have a configuration in which when a print job is received from a terminal apparatus 10 by the image processing apparatus 20, the image processing apparatus 20 assigns an identification number to that print job and gives notice of the number to the terminal apparatus 10, and the identification numbers and the print jobs are stored while establishing correspondence between them in both the terminal apparatus 10 and the image processing apparatus 20.

Further, a preferred embodiment of the present invention can also be configured as a printing system including a printer driver 53 (or a printer driver 53 and a wakeup driver 54), and an image processing apparatus 20.

Further, although in the preferred embodiments, the print jobs and the identification numbers were stored while establishing correspondence between them, it is also possible to have a configuration in which the identification numbers are not stored if the data of the print job and the change contents are transmitted from the image processing apparatus 20 to the terminal apparatus 10 at the time of making a request for print job re-creation from the image processing apparatus 20 to the terminal apparatus 10.

According to an image processing apparatus of the above preferred embodiments of the present invention, for a print job received from a terminal apparatus, it is possible to carry out various forms of setting changes without unnecessarily increasing the communication volume between the terminal apparatus and the image processing apparatus, and without the operator needing to return to the terminal apparatus.

What is claimed is:

1. An image processing apparatus comprising:
 a receiving section which receives a print job created by a printer driver;
 a storage section which stores the print job received by the receiving section;
 a printer section which carries out printing related to the print job received by the receiving section;
 a change receiving section which receives an instruction of change in a content of setting of the print job stored in the storage section;
 a change processing section which creates a print job by changing the content of setting of the print job stored in the storage section based on the instruction of change received by the change receiving section;
 a change requesting section which informs the printer driver about content of the instruction of change received by the change receiving section, and requests the printer driver to create a print job by changing the content of setting of the print job based on the instruction of change; and
 a control section which selects whether to allow the change processing section or the change requesting section to handle the instruction of change received by the change receiving section, and requests a selected section to handle the instruction of change,
 wherein the control section confirms a start-up state of the printer driver when the control section selects the change requesting section, and
 wherein if the control section cannot confirm that the printer driver has started as a result of the confirmation, the control section carries out control so that the change processing section creates a print job by changing the content of setting of the print job stored in the storage section for only instructions of change among one or more instructions of change which have been received by the change receiving section, and which have been selected to be handled by the change processing section.

2. The image processing apparatus of claim 1,
 wherein the control section carries out the selection based on the content of the instruction of change.

3. The image processing apparatus of claim 2,
wherein the control section selects the change requesting section when the content of the instruction of change includes a change element which involves image processing and
wherein the control section selects the change processing section when the contents of the instruction of change does not include a change element which involves image processing.

4. The image processing apparatus of claim 2,
wherein when the control section carries out the selection based on the content of the instruction of change, the control section automatically changes a criterion of the selection according to a processing capacity of the image processing apparatus.

5. The image processing apparatus of claim 4,
wherein the control section determines the processing capacity according to a specification of a hardware resource related to a function of the change processing section.

6. The image processing apparatus of claim 4,
wherein the control section determines the processing capacity according to an unused processing capacity out of a hardware resource related to a function of the change processing section.

7. The image processing apparatus of claim 1,
wherein the control section carries out the selection based on a processing capacity of the image processing apparatus.

8. The image processing apparatus of claim 1,
wherein if the printer driver has not started as a result of the confirmation, the control section starts the printer driver.

9. The image processing apparatus of claim 1,
wherein when the printer driver cannot be used, the control section selects the change processing section.

10. The image processing apparatus of claim 1, further comprising:
a transfer section which transfers the print job after the changing to an external printing apparatus for printing.

11. An image processing apparatus connectable to a terminal apparatus configured to execute a printer driver, the image processing apparatus comprising:
a receiving section which receives a print job created by the printer driver;
a storage section which stores the print job received by the receiving section;
a printer section which carries out printing related to the print job received by the receiving section;
a change receiving section which receives an instruction of change in a content of setting of the print job stored in the storage section;
a change processing section which creates a print job by changing the content of setting of the print job stored in the storage section based on the instruction of change received by the change receiving section;
a change requesting section which informs the printer driver about content of the instruction of change received by the change receiving section, and requests the printer driver to create a print job by changing the content of setting of the print job based on the instruction of change; and
a control section which selects whether to allow the change processing section or the change requesting section to handle the instruction of change received by the change receiving section, and requests a selected section to handle the instruction of change;
wherein the control section confirms a start-up state of the printer driver on the terminal apparatus when the control section selects the change requesting section; and
wherein if the printer driver has not started on the terminal apparatus as a result of the confirmation, the control section makes the terminal apparatus automatically start the printer driver.

12. The image processing apparatus of claim 11,
wherein the control section carries out the selection based on the content of the instruction of change.

13. The image processing apparatus of claim 12,
wherein the control section selects the change requesting section when the content of the instruction of change includes a change element which involves image processing; and
wherein the control section selects the change processing section when the contents of the instruction of change does not include a change element which involves image processing.

14. The image processing apparatus of claim 12,
wherein when the control section carries out the selection based on the content of the instruction of change, the control section automatically changes a criterion of the selection according to a processing capacity of the image processing apparatus.

15. The image processing apparatus of claim 14,
wherein the control section determines the processing capacity according to a specification of a hardware resource related to a function of the change processing section.

16. The image processing apparatus of claim 14,
wherein the control section determines the processing capacity according to an unused processing capacity out of a hardware resource related to a function of the change processing section.

17. The image processing apparatus of claim 11,
wherein the control section carries out the selection based on a processing capacity of the image processing apparatus.

18. An image processing method for an image processing apparatus, the method comprising:
receiving a print job created by a printer driver;
storing the print job received in the print job receiving step in a storage section;
carrying out printing related to the print job received in the print job receiving step;
receiving an instruction of change in a content of setting of the print job stored in the storage section;
creating a print job by a change processing section by changing the content of setting of the print job stored in the storage section based on the instruction of change received in the instruction receiving step;
informing the printer driver about content of the instruction of change received in the instruction receiving step, by a change requesting section;
requesting the printer driver to create a print job by changing the content of setting of the print job based on the instruction of change, by a change requesting section;
selecting whether to allow the change processing section or the change requesting section to handle the instruction of change received in the instruction receiving step; and
requesting a selected section to handle the instruction of change; and
confirming a start-up state of the printer driver when selecting the change requesting section,
wherein if it cannot be confirmed that the printer driver has started as a result of the confirmation, control is carried out so that a print job is created in the creating step by changing the content of setting of the print job stored in the storage section for only instructions of change among one or more instructions of change which have been received in the instruction receiving step, and which have been selected to be handled in the creating step.

19. The image processing method of claim 18,
wherein the selection is carried out based on the content of the instruction of change.

20. The image processing method of claim 19,
wherein the change requesting section is selected when the content of the instruction of change includes a change element which involves image processing and
wherein the change processing section is selected when the contents of the instruction of change does not include a change element which involves image processing.

21. The image processing method of claim 19,
wherein when the selection is carried out based on the content of the instruction of change, a criterion of the selection is automatically changed according to a processing capacity of the image processing apparatus.

\* \* \* \* \*